United States Patent
Yamamoto et al.

(10) Patent No.: US 11,130,605 B2
(45) Date of Patent: Sep. 28, 2021

(54) MULTI-LAYER CONTAINER AND PRODUCTION METHOD THEREFOR, SINGLE-LAYER CONTAINER PRODUCTION METHOD, AND RECYCLED POLYESTER RESIN PRODUCTION METHOD

(71) Applicant: Mitsubishi Gas Chemical Company, Inc., Tokyo (JP)

(72) Inventors: Takashi Yamamoto, Kanagawa (JP); Tomonori Kato, Kanagawa (JP); Katsuya Maruyama, Tokyo (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 338 days.

(21) Appl. No.: 15/763,769

(22) PCT Filed: Sep. 28, 2016

(86) PCT No.: PCT/JP2016/078627
§ 371 (c)(1),
(2) Date: Mar. 27, 2018

(87) PCT Pub. No.: WO2017/057463
PCT Pub. Date: Apr. 6, 2017

(65) Prior Publication Data
US 2018/0273231 A1    Sep. 27, 2018

(30) Foreign Application Priority Data
Oct. 2, 2015   (JP) .............................. JP2015-197133

(51) Int. Cl.
*B29C 49/04*    (2006.01)
*B65D 1/02*    (2006.01)
(Continued)

(52) U.S. Cl.
CPC ........ *B65D 1/0215* (2013.01); *B29B 17/0026* (2013.01); *B29B 17/02* (2013.01);
(Continued)

(58) Field of Classification Search
CPC ......... C08L 67/02; C08L 77/04; B65D 53/06; B32B 27/06
(Continued)

(56) References Cited

U.S. PATENT DOCUMENTS

| 6,274,212 B1 | 8/2001 | Rule et al. |
| 7,087,312 B2 * | 8/2006 | Konrad ................... B32B 27/34 428/474.7 |

(Continued)

FOREIGN PATENT DOCUMENTS

| JP | 2003524048 A | 8/2003 |
| JP | 2004-231964 A | 8/2004 |

(Continued)

OTHER PUBLICATIONS

International Search Report for PCT/JP2016/078627 dated Dec. 27, 2016 (5 pages).

*Primary Examiner* — Ellen S Hock
(74) *Attorney, Agent, or Firm* — Fitch, Even, Tabin & Flannery LLP

(57) ABSTRACT

An object of the present invention is to provide a multilayer container in which yellowing of a regenerated polyester resin at the time of recycle is suppressed and a method for producing the same as well as a method for producing a single-layer container. Furthermore, another object of the present invention is to provide a method for producing a regenerated polyester resin from the foregoing multilayer container and single-layer container. The multilayer container of the present invention includes at least one polyester resin composition layer containing a polyester resin (X) and (Continued)

an amino group-containing compound (A) having a yellowing-suppressing ability; and at least one polyamide resin layer containing a polyamide resin (Y).

9 Claims, 3 Drawing Sheets

(51) Int. Cl.
| | |
|---|---|
| B32B 27/34 | (2006.01) |
| B32B 27/36 | (2006.01) |
| C08K 5/20 | (2006.01) |
| C08L 67/00 | (2006.01) |
| C08L 77/06 | (2006.01) |
| B32B 27/00 | (2006.01) |
| B29B 17/00 | (2006.01) |
| B65D 1/00 | (2006.01) |
| B29B 17/04 | (2006.01) |
| B29B 17/02 | (2006.01) |
| C08K 5/18 | (2006.01) |
| B29C 49/00 | (2006.01) |
| B29C 49/22 | (2006.01) |
| B32B 27/08 | (2006.01) |
| C08G 69/26 | (2006.01) |
| B29K 67/00 | (2006.01) |
| B29B 7/30 | (2006.01) |
| B29K 77/00 | (2006.01) |
| B29K 105/26 | (2006.01) |
| B29L 31/00 | (2006.01) |

(52) U.S. Cl.
CPC .......... *B29B 17/04* (2013.01); *B29B 17/0412* (2013.01); *B29C 49/0005* (2013.01); *B29C 49/22* (2013.01); *B32B 27/00* (2013.01); *B32B 27/08* (2013.01); *B32B 27/34* (2013.01); *B32B 27/36* (2013.01); *B65D 1/00* (2013.01); *C08G 69/26* (2013.01); *C08K 5/18* (2013.01); *C08K 5/20* (2013.01); *C08L 67/00* (2013.01); *C08L 77/06* (2013.01); *B29B 7/30* (2013.01); *B29B 2017/0203* (2013.01); *B29B 2017/0234* (2013.01); *B29B 2017/0484* (2013.01); *B29C 49/04* (2013.01); *B29K 2067/00* (2013.01); *B29K 2067/003* (2013.01); *B29K 2077/00* (2013.01); *B29K 2105/26* (2013.01); *B29K 2995/0067* (2013.01); *B29L 2031/7158* (2013.01); *B32B 2305/70* (2013.01); *B32B 2307/7242* (2013.01); *B32B 2439/00* (2013.01); *B32B 2439/70* (2013.01); *Y02W 30/62* (2015.05); *Y10T 428/13* (2015.01); *Y10T 428/1352* (2015.01)

(58) Field of Classification Search
USPC .............................. 524/445; 428/35.1, 36.92
See application file for complete search history.

(56) References Cited

U.S. PATENT DOCUMENTS

| | | | |
|---|---|---|---|
| 2003/0144402 A1* | 7/2003 | Schenck | ................ C08L 67/02 524/445 |
| 2005/0181155 A1* | 8/2005 | Share | ...................... C08J 3/226 428/35.7 |
| 2006/0226565 A1 | 10/2006 | Hale et al. | |
| 2010/0233405 A1* | 9/2010 | Andrews | ................ C08L 67/02 428/36.92 |

FOREIGN PATENT DOCUMENTS

| | | |
|---|---|---|
| JP | 2005-329627 A | 12/2005 |
| JP | 2006290436 A | 10/2006 |
| JP | 2012520364 A | 9/2012 |
| JP | 2016011337 A | 1/2016 |
| WO | 2010103023 A1 | 9/2010 |

* cited by examiner

[Fig. 1]
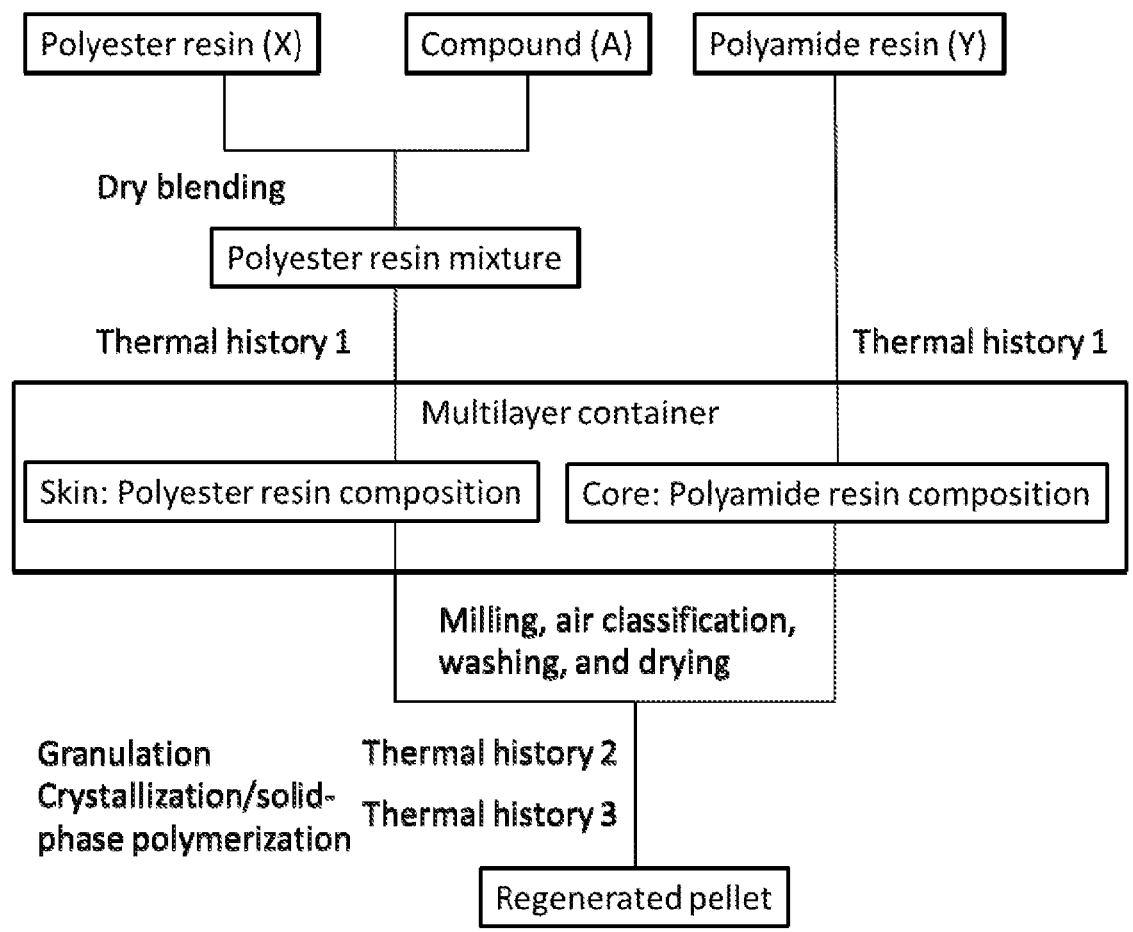

[Fig. 2]
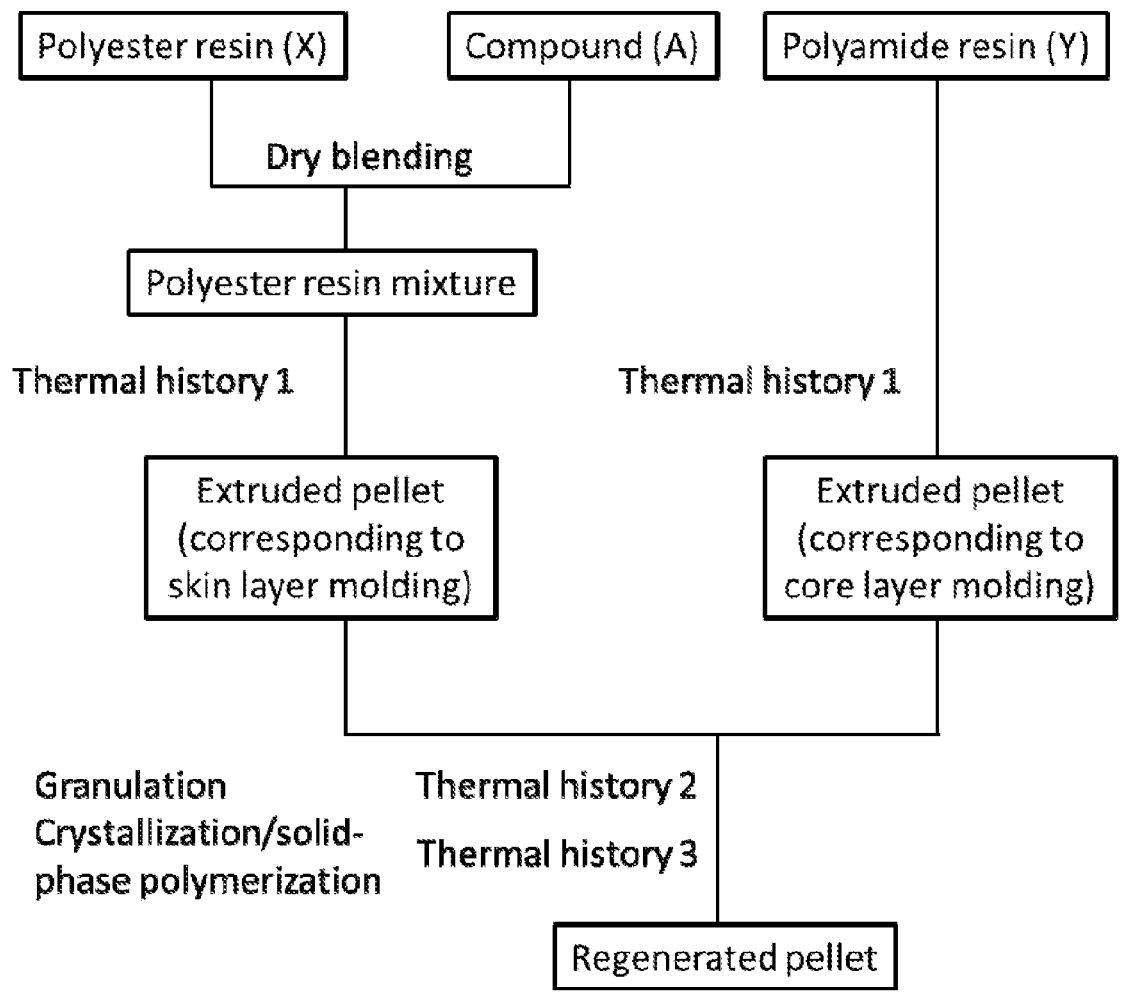

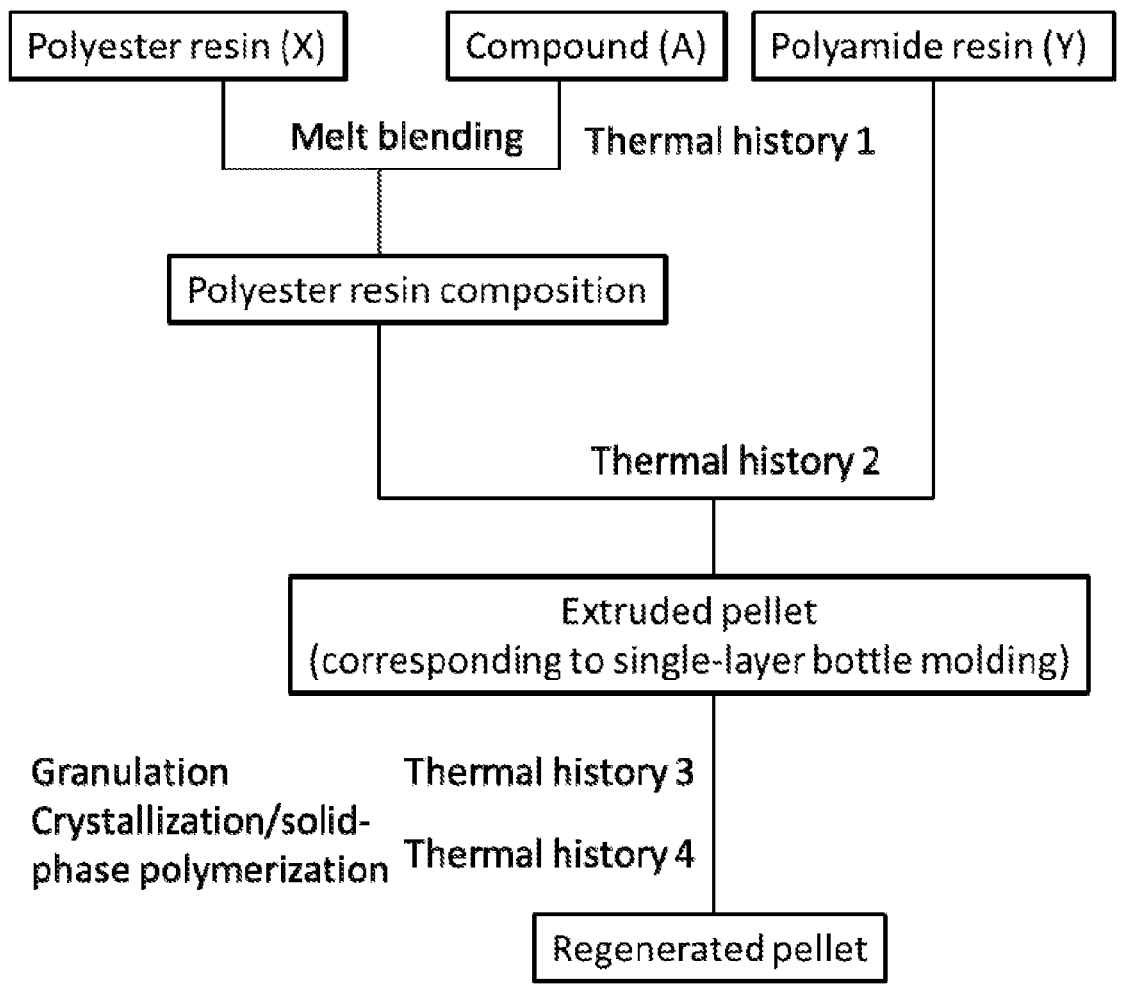

MULTI-LAYER CONTAINER AND PRODUCTION METHOD THEREFOR, SINGLE-LAYER CONTAINER PRODUCTION METHOD, AND RECYCLED POLYESTER RESIN PRODUCTION METHOD

CROSS-REFERENCE TO RELATED APPLICATIONS

This application is a U.S. national phase application filed under 35 U.S.C. § 371 of International Application PCT/JP2016/078627, filed on Sep. 28, 2016, designating the United States, which claims priority from Japanese Application Number 2015-197133, filed Oct. 2, 2015.

FIELD OF THE INVENTION

The present invention relates to a multilayer container and a method for producing the same, a method for producing a single-layer container, and a method for producing a regenerated polyester resin.

BACKGROUND OF THE INVENTION

Polymers obtained by using, as monomers, an aromatic dicarboxylic acid compound and an aliphatic diol compound, for example, polyester resins represented by polyethylene terephthalate (PET) and so on, have such advantages that they are excellent in transparency, mechanical performance, melt stability, solvent resistance, flavor retention, gas barrier property, recyclability, and so on. For that reason, the aromatic polyester resins are widely used as various packaging materials, such as films, sheets, and hollow containers. Though the polyester resins have a high gas barrier property, they are not always sufficient for applications where a more gas barrier property against oxygen, carbon dioxide, etc. is required. For that reason, examples of a method for improving the gas barrier property of polyester resin include methods, such as vapor deposition of aluminum oxide or silicon oxide onto a molded article or a packaging container made of a polyester resin, or coating, lamination, or melt mixing of a molded article or a packaging container made of a polyester resin with a resin having a gas barrier property higher than that of a polyester resin.

An example of resins having such a higher gas barrier property than polyester resins is an ethylene-vinyl alcohol copolymer resin. The ethylene-vinyl alcohol copolymer resin has poor compatibility with polyester resin, due to a characteristic intrinsic to the molecular structure thereof. When the both resins are mixed together, the formed resin composition assumes a white turbid state, so that there was involved such a defect that the transparency which is a characteristic of polyester resin is impaired. Further, at an optimum processing temperature for polyester resin, the ethylene-vinyl alcohol copolymer resin tends to rapidly undergo thermal degradation, and therefore causes a problem of detracting from the processing stability of polyester resin.

Examples of other gas barrier resins than ethylene-vinyl alcohol copolymers include polyamide resins represented by nylon 6, nylon 66, and so on. In particular, polymetaxylyleneadipamide, which is obtained through polymerization of a diamine component composed mainly of metaxylylenediamine and a dicarboxylic acid component composed mainly of adipic acid, is a polyamide resin especially excellent in gas barrier property, and hence, it is suitable. As compared with any other polyamide resins, polymetaxylyleneadipamide has a higher gas barrier property and, in addition, has a glass transition temperature, a melting point, and crystallinity that are close to those of polyethylene terephthalate, which is one of the most generally used polyester resins, has a similar molding condition to that of polyethylene terephthalate, and hence, it is readily subjected to molding processing with polyester resin. Consequently, it may be said that polymetaxylyleneadipamide is a resin extremely suitable as a material for improving the gas barrier property of polyester resin.

However, in the polyester resin composition containing a polyamide, there is a possibility that yellowing to be caused due to thermal history is liable to proceed as compared with a polyester alone. For that reason, there is a concern that yellowing is caused in a polyamide-containing polyester container per se, or in a recycle process of recovering the container and reusing it. This becomes a factor of lowering a commercial value of the packaging container, and hence, there has been required a method of suppressing the yellowing as far as possible. In response to such a problem, PTL 1 proposes a yellowing-preventing formulation in which a lactone-based stabilizer, a phenol-based stabilizer, an aldehyde scavenger, an organic phosphorus-based stabilizer, and the like are blended in a mixture of a polyester and a polyamide.

In addition, PTL 2 discloses a multilayer container composed of an inner layer of a polyester resin having, as an aldehyde reducing agent, a metaxylylene group-containing polyamide resin added therein and an outer layer of a gas shielding resin.

Furthermore, PTL 3 describes a method for decreasing the acetaldehyde content of a melt-processed polyester, including mixing a polyester with a specified organic additive compound having reactivity with acetaldehyde in the polyester.

CITATION LIST

Patent Literature

PTL 1: JP 2012-520364 A
PTL 2: JP 2006-290436 A
PTL 3: JP 2003-524048 A

SUMMARY OF INVENTION

An object of the present invention is to provide a multilayer container in which yellowing of a regenerated polyester resin at the time of recycle is suppressed and a method for producing the same. Furthermore, another object of the present invention is to provide a method for producing a single-layer container in which yellowing of a regenerated polyester resin at the time of recycle is suppressed. In addition, another object of the present invention is to provide a method for producing a regenerated polyester resin from the aforementioned multilayer container and single-layer container, respectively.

In view of the aforementioned problem, the present inventors made extensive and intensive investigations. As a result, it has been found that when a specified compound is contained in a polyester resin composition layer, a multilayer container in which yellowing of a regenerated polyester resin is suppressed and a method for producing the same, and a method for producing a regenerated polyester resin from the foregoing multilayer container can be provided, thereby leading to accomplishment of the present invention. Furthermore, the present inventors have found that when a specified compound is previously melt kneaded with a polyester resin, a method for producing a single-layer container in which yellowing of a regenerated polyester resin is suppressed can be provided, thereby leading to accomplishment of the present invention. The present invention provides the following [1] to [22].

[1] A multilayer container including:
at least one polyester resin composition layer containing a polyester resin (X) and an amino group-containing compound (A) having a yellowing-suppressing ability; and
at least one polyamide resin layer containing a polyamide resin (Y).

[2] The multilayer container as set forth in [1], wherein the polyester resin (X) has a structural unit derived from a dicarboxylic acid and a structural unit derived from a diol, 50 mol % or more of the structural unit derived from a dicarboxylic acid being a structural unit derived from terephthalic acid; and 50 mol % or more of the structural unit derived from a diol being a structural unit derived from ethylene glycol.

[3] The multilayer container as set forth in [1] or [2], wherein the polyamide resin (Y) has a structural unit derived from a diamine and a structural unit derived from a dicarboxylic acid, 50 mol % or more of the structural unit derived from a diamine being a structural unit derived from xylylenediamine; and 50 mol % or more of the structural unit derived from a dicarboxylic acid being a structural unit derived from adipic acid.

[4] The multilayer container as set forth in any one of [1] to [3], wherein the polyester resin (X) has a structural unit derived from a dicarboxylic acid and a structural unit derived from a diol, 80 mol % or more of the structural unit derived from a dicarboxylic acid being a structural unit derived from terephthalic acid; and 80 mol % or more of the structural unit derived from a diol being a structural unit derived from ethylene glycol.

[5] The multilayer container as set forth in any one of [1] to [4], wherein the polyamide resin (Y) has a structural unit derived from a diamine and a structural unit derived from a dicarboxylic acid, 80 mol % or more of the structural unit derived from a diamine being a structural unit derived from xylylenediamine; and 80 mol % or more of the structural unit derived from a dicarboxylic acid being a structural unit derived from adipic acid.

[6] The multilayer container as set forth in any one of [1] to [5], wherein the amino group-containing compound (A) having a yellowing-suppressing ability is at least one compound selected from the group consisting of anthranilamide, anthranilic acid, and nylon 6I/6T.

[7] The multilayer container as set forth in any one of [1] to [6], wherein the content of the amino group-containing compound (A) having a yellowing-suppressing ability is from 0.005 to 3.0 parts by mass based on 100 parts by mass of the polyester resin (X).

[8] The multilayer container as set forth in any one of [1] to [7], wherein the amino group-containing compound (A) having a yellowing-suppressing ability is anthranilamide.

[9] The multilayer container as set forth in any one of [1] to [7], wherein the amino group-containing compound (A) having a yellowing-suppressing ability is nylon 6I/6T.

[10] The multilayer container as set forth in any one of [1] to [9], wherein the multilayer container is a multilayer hollow container.

[11] The multilayer container as set forth in any one of [1] to [10], wherein the multilayer container has two or more polyester resin composition layers and has at least one polyamide resin layer sandwiched directly or indirectly between the polyester resin composition layers.

[12] The multilayer container as set forth in any one of [1] to [11], wherein the multilayer container has a three-layer structure and has a polyamide resin layer sandwiched between two layers of the polyester resin composition layer.

[13] The multilayer container as set forth in any one of [1] to [12], wherein an amino group concentration of the polyamide resin (Y) is 50 µmol/g or less.

[14] The multilayer container as set forth in any one of [1] to [13], wherein the polyamide resin layer contains a transition metal.

[15] A method for producing the multilayer container as set forth in any one of [1] to [14], including the following step (S1) and step (S2) in this order.
Step (S1): A step of previously mixing the polyester resin (X) and the amino group-containing compound (A) having a yellowing-suppressing ability, to prepare a polyester resin mixture or a polyester resin composition.
Step (S2): A step of extruding the polyester resin mixture or the polyester resin composition from a first extruder and the polyamide resin composition containing the polyamide resin (Y) from a second extruder, respectively, followed by molding.

[16] A method for producing a single-layer container, including the following step (T1) and step (T2) in this order.
Step (T1): A step of previously melt kneading a polyester resin (X) and an amino group-containing compound (A) having a yellowing-suppressing ability, to prepare a polyester resin composition.
Step (T2): A step of melt kneading the polyester resin composition and a polyamide resin (Y), followed by molding.

[17] A method for producing a regenerated polyester, including a step of recovering the polyester resin composition from the multilayer container as set forth in any one of [1] to [14].

[18] The method for producing a regenerated polyester as set forth in [17], including a step of removing the whole or a part of the polyamide resin layer from the multilayer container to recover the polyester resin composition layer.

[19] The method for producing a regenerated polyester as set forth in [18], wherein the removal of the polyamide resin layer is conducted by, after milling of the multilayer container, air classification.

[20] The method for producing a regenerated polyester as set forth in any one of [17] to [19], wherein the recovered polyester resin composition is subjected to at least one step selected from the group consisting of a crystallization step and a solid-phase polymerization step.

[21] A method for producing a regenerated polyester, including a step of recovering the polyester resin from the single-layer container obtained by the production method as set forth in [16].

[22] The method for producing a regenerated polyester as set forth in [21], wherein the recovered polyester resin is subjected to at least one step selected from the group consisting of a crystallization step and a solid-phase polymerization step.

In accordance with the present invention, a multilayer container in which yellowing of a regenerated polyester at the time of recycle is suppressed and a method for producing the same are provided. Furthermore, in accordance with the present invention, a method for producing a single-layer container in which yellowing of a regenerated polyester resin at the time of recycle is suppressed is provided. In addition, in accordance with the present invention, a method for producing a regenerated polyester resin from the aforementioned multilayer container and single-layer container, respectively is provided.

BRIEF DESCRIPTION OF DRAWINGS

FIG. 1 is a chart showing an evaluation method of a multilayer container conducted in the Examples.

FIG. 2 is a chart showing an evaluation method (alternative method) of a multilayer container conducted in the Examples.

FIG. 3 is a chart showing an evaluation method of a single-layer container conducted in the Examples.

DESCRIPTION OF EMBODIMENTS

The present invention is hereunder described by reference to embodiments.

The present invention has been made based on the finding that in a multilayer container including at least one polyester resin composition layer containing a polyester resin (X) and at least one polyamide resin layer containing a polyamide resin (Y), when an amino group-containing compound (A) having a yellowing-suppressing ability (hereinafter also referred to simply as "compound (A)") is contained in the polyester resin composition layer, on the occasion of recycling a used multilayer container, yellow coloring (yellowing) of the regenerated polyester resin is suppressed. In particular, it is suitable to produce the aforementioned multilayer container by a method in which the polyester resin (X) and the compound (A) are mixed to prepare a polyester resin mixture or a polyester resin composition, and a polyester resin composition layer composed of the polyester resin mixture or polyester resin composition is laminated with a polyamide resin layer containing a polyamide resin.

In addition, the present invention has been made based on the finding that in a single-layer container obtained by previously melt kneading the polyester resin (X) and the compound (A) to prepare a polyester resin composition and melt kneading the aforementioned polyester resin composition and the polyamide resin (Y), followed by molding, on the occasion of recycle after use, yellowing of the regenerated polyester resin is suppressed.

Though the mechanism of revealing such an effect is not elucidated yet, a part thereof may be conjectured as follows.

In the polyester resin (X) represented by polyethylene terephthalate, when it is subjected to a heating operation at the time of melt molding or allowed to stand for a long period of time, a trace amount of acetaldehyde is formed due to decomposition of a polymer chain terminal glycol group, etc., or the like. Since the acetaldehyde has an inherent odor, it is a component that is undesirable for a packaging container in view of a problem, such as attachment of the odor to the contents, etc., and a variety of methods for reducing the acetaldehyde have been proposed so far. For example, there are exemplified a method of volatilizing and removing the acetaldehyde through dehumidification or solid-phase polymerization of the polyester resin (X); a method of blending a component chemically or physically adsorbing the aldehyde in the polyester; and the like.

Meanwhile, from the structural standpoint of the polyamide resin (Y), though an amino group remains in the polymer ends, the acetaldehyde may react with an amine to form an imine compound that is a Schiff base. In consequence, it may be said that the polyamide resin (Y) not only improves the gas barrier property of the polyester resin (X) but also has an acetaldehyde trapping effect of the polyester, and such is preferred in this standpoint. However, the imine compound that is a Schiff base, which may be formed through a reaction between acetaldehyde and an amine, has an absorption region in the vicinity of blue color, and there is a possibility that the absorption region may be further widened due to the matter that the chain of a conjugated bond becomes longer following conversion into an enamine. According to this, the yellowing by acetaldehyde is extremely promoted by the polyamide, a lowering of the quality is caused due to worsening of the appearance of the packaging container, and furthermore, the recycle property of the packaging container is impaired, too. In consequence, with respect to the addition of the polyamide resin to the polyester resin or the lamination of the polyester resin and the polyamide resin, though an improvement in the gas barrier property or an effect for reducing acetaldehyde to some extent could be expected, the entrainment of yellowing that is a negative effect becomes a large problem.

Now, in the case of melt kneading a polyester resin and a polyamide resin using an extruder or an injection molding machine, the both are not completely compatibilized with each other and take a dispersed state called a sea-island structure at the micro-level. As for this matter, it may be considered that in at least a part thereof, the polyester resin and the polyamide resin exist as a separate resin from each other at the micro-level. In the single-layer container of the present invention, attention was paid to this point, and a method in which the reaction between the acetaldehyde and the polyamide resin is suppressed to suppress the yellowing was investigated. As a result, astonishingly, it has been found that when a specified amino group-containing compound (compound (A)) as an acetaldehyde scavenger is previously melt kneaded in the polyester resin (X), and then, the polyamide resin (Y) is blended, a mixed resin of the polyester resin (X) and the polyamide resin (Y), which is extremely scarcely colored, is obtained. Though the reason for this is not elucidated yet, it may be considered that when acetaldehyde which may be generated from the polyester resin (X) effectively reacts with the compound (A), the movement of acetaldehyde into the polyamide resin (Y) (separately existing at the micro-level) is prevented from occurring, and as a result, the reaction between the acetaldehyde and the polyamide resin (Y) is suppressed, whereby the yellowing is suppressed.

In the multilayer container of the present invention, when the polyester resin composition layer contains the polyester resin (X) and the compound (A), similar to the single-layer container, the acetaldehyde is trapped in the polyester resin composition layer before it moves into the polyamide resin layer, and therefore, it may be conjectured that the yellowing is extremely effectively suppressed.

[Multilayer Container and Production Method Thereof]

The multilayer container of the present invention includes at least one polyester resin composition layer containing the polyester resin (X) and the amino group-containing compound (A) having a yellowing-suppressing ability and at least one polyamide resin layer containing the polyamide resin (Y).

<Polyester Resin Composition Layer>

The polyester resin composition layer contains the polyester resin (X) and the amino group-containing compound (A) having a yellowing-suppressing ability.

(Polyester Resin (X))

The polyester resin (X) which the polyester resin composition layer contains is preferably a polycondensation polymer between a dicarboxylic acid and a diol. As the structural unit derived from a dicarboxylic acid (dicarboxylic acid unit), a structural unit derived from an aromatic dicarboxylic acid is preferably exemplified, and as the structural unit derived from a diol (diol unit), a structural unit derived from an aliphatic diol is preferably exemplified.

Examples of the aromatic dicarboxylic acid include terephthalic acid, isophthalic acid, orthophthalic acid, biphenyldicarboxylic acid, diphenyl ether dicarboxylic acid, diphenylsulfone dicarboxylic acid, diphenylketone dicarboxylic acid, 2,6-naphthalenedicarboxylic acid, 1,4-naphthalenedicarboxylic acid, 2,7-naphthalenedicarboxylic acid, and the like. Terephthalic acid, isophthalic acid, orthophthalic acid, naphthalenedicarboxylic acid, and 4,4'-biphenyldicarboxylic acid are preferred, with terephthalic acid being more preferred.

Examples of the aromatic dicarboxylic acid also include sulfophthalic acid and a sulfophthalic acid metal salt. The sulfophthalic acid metal salt is a metal salt of sulfophthalic acid. Examples of the metal atom include an alkali metal, such as lithium, sodium, potassium, etc., and an alkaline earth metal, such as beryllium, magnesium, calcium, strontium, etc. Among these, an alkali metal is preferred, sodium or lithium is more preferred, and sodium is still more preferred.

In the sulfophthalic acid and sulfophthalic acid metal salt, the two carboxy groups may bond in any position of an ortho-position, a meta-position, or a para-position, but they bond preferably in a meta-position or a para-position, and more preferably in a meta-position. That is, sulfoterephthalic acid, sulfoisophthalic acid, a sulfoterephthalic acid metal salt, or a sulfoisophthalic acid metal salt is preferred, and sulfoisophthalic acid or a sulfoisophthalic acid metal salt is more preferred.

The sulfophthalic acid and sulfophthalic acid metal salt may be substituted, and examples of the substituent include a substituted or unsubstituted alkyl group and a substituted or unsubstituted aryl group. The carbon number of the aforementioned alkyl group is preferably 1 to 8, more preferably 1 to 6, and still more preferably 1 to 4. Specifically, examples thereof include a methyl group, an ethyl group, an n-propyl group, an isopropyl group, an n-butyl group, a t-butyl group, an n-octyl group, and a 2-ethylhexyl group. The aryl group is preferably an aryl group having a carbon number of 6 to 12. Examples thereof include a phenyl group and a naphthyl group, with a phenyl group being preferred.

Specifically, examples of the sulfophthalic acid and the sulfophthalic acid metal salt include 5-sulfoisophthalic acid, sodium 5-sulfoisophthalate, lithium 5-sulfoisophthalate, potassium 5-sulfoisophthalate, calcium bis(5-sulfoisophthalate), sodium dimethyl 5-sulfoisophthalate, sodium diethyl 5-sulfoisophthalate, and the like.

In the case where the polyester resin contains a structural unit derived from at least one selected from the group consisting of sulfophthalic acid and a sulfophthalic acid metal salt, it is preferred that the resin contains a structural unit derived from at least a sulfophthalic acid metal salt.

The content of the structural unit derived from sulfophthalic acid and a sulfophthalic acid metal salt in the polyester resin is preferably 0.01 to 15 mol %, more preferably 0.03 to 10.0 mol %, still more preferably 0.06 to 5.0 mol %, and yet still more preferably 0.08 to 1.0 mol % of the entire structural unit derived from a dicarboxylic acid.

Examples of the aliphatic diol include aliphatic diols having a linear or branched structure, such as ethylene glycol, 2-butene-1,4-diol, trimethylene glycol, tetramethylene glycol, hexamethylene glycol, neopentyl glycol, methylpentanediol, diethylene glycol, etc.; and alicyclic diols, such as cyclohexanedimethanol, isosorbide, spiro glycol, 2,2,4,4-tetramethyl-1,3-cyclobutanediol, norbornene dimethanol, tricyclodecane dimethanol, etc. Among these, ethylene glycol, neopentyl glycol, and cyclohexanedimethanol are preferred, with ethylene glycol being more preferred.

It is also preferred that the polyester resin contains, as the structural unit derived from a diol, a structural unit derived from an alicyclic diol. The alicyclic diol is preferably at least one alicyclic diol selected from the group consisting of cyclohexanedimethanol, isosorbide, spiro glycol, and 2,2,4,4-tetramethyl-1,3-cyclobutanediol. In the case where the polyester resin contains the aforementioned structural unit derived from an alicyclic diol, its content is preferably 1 to 50 mol %, more preferably 2 to 40 mol %, still more preferably 3 to 30 mol %, and yet still more preferably 5 to 25 mol % of the entire structural unit derived from a diol.

As the polyester resin which is used in the present invention, it is preferred that not only 50 mol % or more of the structural unit derived from a dicarboxylic acid (dicarboxylic acid unit) is a structural unit derived from an aromatic dicarboxylic acid, but also 50 mol % or more of the structural unit derived from a diol (diol unit) is a structural unit derived from an aliphatic diol; it is more preferred that not only 50 mol % or more of the dicarboxylic acid unit is a structural unit derived from terephthalic acid, but also 50 mol % or more of the diol unit is a structural unit derived from ethylene glycol; it is still more preferred that not only 80 mol % or more of the dicarboxylic acid unit is a structural unit derived from terephthalic acid, but also 80 mol % or more of the diol unit is a structural unit derived from ethylene glycol; and it is yet still more preferred that not only 90 mol % or more of the dicarboxylic acid unit is a structural unit derived from terephthalic acid, but also 90 mol % or more of the diol unit is a structural unit derived from ethylene glycol.

In the following description, the polyester resin in which not only 50 mol % or more of the dicarboxylic acid unit is a structural unit derived from terephthalic acid, but also 50 mol % or more of the diol unit is a structural unit derived from ethylene glycol is also referred to as polyethylene terephthalate.

When the proportion of the unit derived from terephthalic acid occupying in the dicarboxylic acid unit is 50 mol % or more, as described above, the polyester resin is hard to become amorphous, and accordingly, in the multilayer container, it hardly undergoes thermal shrinkage at the time of filling a high-temperature material therein, or the like, and the container has favorable heat resistance.

In the case where the polyethylene terephthalate is used as the polyester resin, the polyester resin may be constituted of polyethylene terephthalate alone but may contain any other polyester resin than polyethylene phthalate, in addition to the polyethylene terephthalate. The polyethylene terephthalate is contained in an amount of preferably 80 to 100% by mass, and more preferably 90 to 100% by mass relative to the total amount of the polyester resin.

A preferred embodiment in the case where the polyester resin is polyethylene terephthalate is hereunder described.

The polyethylene terephthalate may be one containing a structural unit derived from any other bifunctional compound than terephthalic acid and ethylene glycol, and examples of the bifunctional compound include the aforementioned aromatic dicarboxylic acids and aliphatic diols other than terephthalic acid and ethylene glycol, as well as other bifunctional compounds than aromatic dicarboxylic acids and aliphatic diols. On this occasion, the structural unit derived from the other bifunctional compound than terephthalic acid and ethylene glycol accounts for preferably 20 mol % or less, and more preferably 10 mol % or less relative to the total mol of the entire structural unit constituting the polyester resin.

Even in the case where the polyester resin is any other polyester resin than polyethylene terephthalate, the polyester resin may be one containing a structural unit derived from any other bifunctional compound than aromatic dicarboxylic acids and aliphatic diols.

Examples of the other bifunctional compound than aliphatic diols and aromatic dicarboxylic acids include other aliphatic bifunctional compounds than aliphatic diols and other aromatic bifunctional compounds than aromatic dicarboxylic acids.

Examples of the other aliphatic bifunctional compounds than aliphatic diols include linear or branched aliphatic bifunctional compounds. Specifically, examples thereof include aliphatic dicarboxylic acids, such as malonic acid, succinic acid, adipic acid, azelaic acid, sebacic acid, etc.; aliphatic hydroxycarboxylic acids, such as 10-hydroxyoctadecanoyl acid, lactic acid, hydroxyacrylic acid, 2-hydroxy-2-methylpropionic acid, hydroxybutyric acid, etc.; and the like.

The aforementioned aliphatic bifunctional compound may also be an alicyclic bifunctional compound. Examples thereof include alicyclic dicarboxylic acids, such as cyclohexanedicarboxylic acid, norbornanedicarboxylic acid, tricyclodecanedicarboxylic acid, etc.; alicyclic hydroxycarboxylic acids, such as hydroxymethyl cyclohexanecarboxylic acid, hydroxymethyl norbornenecarboxylic acid, hydroxymethyl tricyclodecanecarboxylic acid, etc.; and the like.

Among these, preferred examples of the alicyclic bifunctional compound include 1,2-cyclohexanedicarboxylic acid, 1,3-cyclohexanedicarboxylic acid, 1,4-cyclohexanedicarboxylic acid, and the like. The copolymerized polyester resin containing a structural unit derived from such an alicyclic bifunctional compound is easily produced, and it is possible to improve drop impact strength or transparency of the multilayer container. Among those described above, 1,4-cyclohexanedicarboxylic acid is more preferred because it is readily available, and high drop impact strength is obtainable therefrom.

Though the other aromatic bifunctional compound than aromatic dicarboxylic acids is not particularly limited, specific examples thereof include aromatic hydroxycarboxylic acids, such as hydroxybenzoic acid, hydroxytoluic acid, hydroxynaphthoic acid, 3-(hydroxyphenyl)propionic acid, hydroxyphenylacetic acid, 3-hydroxy-3-phenylpropionic acid, etc.; and aromatic diols, such as bisphenol compounds, hydroquinone compounds, etc.

In the case where the polyethylene terephthalate contains a structural unit derived from an aromatic dicarboxylic acid other than terephthalic acid, the aromatic dicarboxylic acid is preferably selected from the group consisting of isophthalic acid, orthophthalic acid, naphthalenedicarboxylic acid, and 4,4'-biphenyldicarboxylic acid. These compounds are low in costs, and a copolymerized polyester resin containing one member of these compounds is easily produced. In the case where the polyethylene terephthalate contains a structural unit derived from such an aromatic dicarboxylic acid, the proportion of the structural unit derived from an aromatic dicarboxylic acid is preferably 1 to 20 mol %, and more preferably 1 to 10 mol % of the dicarboxylic acid unit.

Among these, the aromatic dicarboxylic acid is especially preferably isophthalic acid or naphthalenedicarboxylic acid, and most preferably isophthalic acid. The polyethylene terephthalate containing a structural unit derived from isophthalic acid is excellent in moldability and is excellent from the standpoint of preventing blushing of a molded article to be caused due to the matter that a crystallization rate becomes slow. In addition, the polyethylene terephthalate containing a structural unit derived from naphthalenedicarboxylic acid increases a glass transition point of the resin, improves the heat resistance, and absorbs an ultraviolet ray, and therefore, it is suitably used for the production of a multilayer container which is required to be resistant to an ultraviolet ray. As the naphthalenedicarboxylic acid, a 2,6-naphthalenedicarboxylic acid component is preferred because it is easily produced and is high in economy.

The polyester resin may also contain a structural unit derived from a monofunctional compound, such as a monocarboxylic acid, a monoalcohol, etc. Specific examples of such a compound include aromatic monofunctional carboxylic acid, such as benzoic acid, o-methoxybenzoic acid, m-methoxybenzoic acid, p-methoxybenzoic acid, o-methylbenzoic acid, m-methylbenzoic acid, p-methylbenzoic acid, 2,3-dimethylbenzoic acid, 2,4-dimethylbenzoic acid, 2,5-dimethylbenzoic acid, 2,6-dimethylbenzoic acid, 3,4-dimethylbenzoic acid, 3,5-dimethylbenzoic acid, 2,4,6-trimethylbenzoic acid, 2,4,6-trimethoxybenzoic acid, 3,4,5-trimethoxybenzoic acid, 1-naphthoic acid, 2-naphthoic acid, 2-biphenylcarboxylic acid, 1-naphthaleneacetic acid, 2-naphthaleneacetic acid, etc.; aliphatic monocarboxylic acids, such as propionic acid, butyric acid, n-octanoic acid, n-nonanoic acid, myristic acid, pentadecanoic acid, stearic acid, oleic acid, linoleic acid, linolenic acid, etc.; aromatic monoalcohols, such as benzyl alcohol, 2,5-dimethylbenzyl alcohol, 2-phenethyl alcohol, phenol, 1-naphthol, 2-naphthol, etc.; aliphatic or alicyclic monoalcohols, such as butyl alcohol, hexyl alcohol, octyl alcohol, pentadecyl alcohol, stearyl alcohol, a polyethylene glycol monoalkyl ether, a polypropylene glycol monoalkyl ether, a polytetramethylene glycol monoalkyl ether, oleyl alcohol, cyclododecanol, etc.; and the like.

Among these, from the viewpoints of easiness of the production of polyester and production costs thereof, benzoic acid, 2,4,6-trimethoxybenzoic acid, 2-naphthoic acid, stearic acid, and stearyl alcohol are preferred. The proportion of the structural unit derived from the monofunctional compound is preferably 5 mol % or less, more preferably 3 mol % or less, and still more preferably 1 mol % or less relative to the total mol of the entire structural unit of the polyester resin. The monofunctional compound functions as a terminal-sealing agent for end groups or branched chains of the polyester resin molecular chain, thereby suppressing an excessive increase of the molecular weight of the polyester resin and preventing gelation from occurring.

Furthermore, in order to obtain necessary physical properties, the polyester resin may contain, as a copolymerization component, a polyfunctional compound having at least three groups selected from a carboxy group, a hydroxy group, and an ester-forming group thereof. Examples of the polyfunctional compound include aromatic polycarboxylic acids, such as trimesic acid, trimellitic acid, 1,2,3-benzenetricarboxylic acid, pyromellitic acid, 1,4,5,8-naphthalenetetracarboxylic acid, etc.; alicyclic polycarboxylic acids, such as 1,3,5-cyclohexanetricarboxylic acid, etc.; aromatic polyhydric alcohols, such as 1,3,5-trihydroxybenzene, etc.; aliphatic or alicyclic polyhydric alcohols, such as trimethylolpropane, pentaerythritol, glycerin, 1,3,5-cyclohexanetriol, etc.; aromatic hydroxycarboxylic acids, such as 4-hydroxyisophthalic acid, 3-hydroxyisophthalic acid, 2,3-dihydroxybenzoic acid, 2,4-dihydroxybenzoic acid, 2,5-dihydroxybenzoic acid, 2,6-dihydroxybenzoic acid, protocatechuic acid, gallic acid, 2,4-dihydroxyphenylacetic acid, etc.; aliphatic hydroxycarboxylic acids, such as tartaric acid, malic acid, etc.; and esters thereof.

The proportion of the structural unit derived from a polyfunctional compound in the polyester resin is preferably less than 0.5 mol % relative to the total molar number of the entire structural unit of the polyester.

Among those mentioned above, from the viewpoints of reactivity and production costs, examples of the preferred polyfunctional compound include trimellitic acid, pyromellitic acid, trimesic acid, trimethylolpropane, and pentaerythritol.

For the production of the polyester resin, a known method, such as direct esterification and trans-esterification, may be applied. Examples of a polycondensation catalyst which is used at the time of production of the polyester resin may include known antimony compounds, such as antimony trioxide, antimony pentoxide, etc.; known germanium compounds, such as germanium oxide, etc.; known aluminum compounds, such as aluminum chloride, etc.; and the like, to which, however, the polycondensation catalyst is not limited. In addition, examples of other production method include a method of subjecting polyester resins of a different kind from each other to trans-esterification through long residence time and/or high-temperature extrusion.

The polyester resin may possibly contain a small amount of a diethylene glycol by-product unit which is a dimer of the ethylene glycol component and is formed in a small amount in a production process of polyester resin. In order that the multilayer container may keep favorable physical properties, it is preferred that the proportion of the diethylene glycol unit in the polyester resin is low as far as possible. The proportion of the structural unit derived from diethylene glycol is preferably 3 mol % or less, more preferably 2 mol % or less, and still more preferably 1 mol % or less relative to the entire structural unit of the polyester resin.

The polyester resin may include a regenerated polyester resin, or a material derived from a used polyester or an industrially recycled polyester (for example, a polyester monomer, a catalyst, and an oligomer).

The polyester resin may be used alone, or may be used in combination of two or more resins.

Though an intrinsic viscosity of the polyester resin is not particularly limited, it is preferably 0.5 to 2.0 dL/g, and more preferably 0.6 to 1.5 dL/g. When the intrinsic viscosity is 0.5 dL/g or more, the polyester resin has a sufficiently high molecular weight, and hence, the multilayer container can reveal a mechanical property necessary as a structure.

The intrinsic viscosity is one measured by dissolving a polyester resin as a measurement object in a mixed solvent of phenol/1,1,2,2-tetrachloroethane (=6/4 mass ratio) to prepare 0.2, 0.4, and 0.6 g/dL solutions, followed by measurement at 25° C. with an automatic kinematic viscosity tester (Viscotek, manufactured by Malvern Instruments Limited).
(Amino Group-Containing Compound (A) Having Yellowing-Suppressing Ability)

In the present invention, the polyester resin composition layer contains the amino group-containing compound (A) having a yellowing-suppressing ability (compound (A)). Though the compound (A) is not particularly limited so long as it is a compound having an ability to suppress the yellowing of the regenerated polyester resin and containing an amino group, it is preferably at least one compound selected from the group consisting of an aminobenzamide, an aminobenzoic acid, and nylon 6I/6T, and more preferably at least one compound selected from the group consisting of anthranilamide, anthranilic acid, and nylon 6I/6T.

As for the aminobenzamide, though the amino group may be substituted in any of the 2 to 4-positions, it is preferably substituted in the 2- or 3-position. The aminobenzamide is preferably anthranilamide (2-aminobenzamide) represented by the following formula.

As for the aminobenzoic acid, though the amino group may be substituted in any of the 2 to 4-positions, it is preferably substituted in the 2- or 3-position. The aminobenzoic acid is preferably anthranilic acid (2-aminobenzoic acid) represented by the following formula.

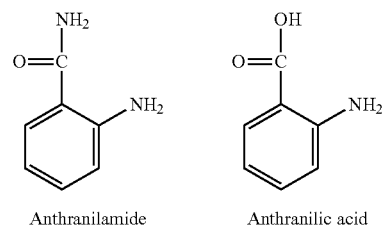 [SMILES: NC(=O)c1ccccc1N ; Nc1ccccc1C(=O)O]

Anthranilamide           Anthranilic acid

The nylon 6I/6T is a hexamethylenediamine-isophthalic acid-terephthalic acid copolymerized polyamide and is a hexamethylene isophthalamide/hexamethylene terephthalamide copolymer. As for the nylon 6I/6T, marketed products may be used, and examples thereof include Selar (registered trademark) PA 3426 (manufactured by DuPont) and NOVAMID X21 (manufactured by DSM).

A weight average molecular weight of the nylon 6I/6T is preferably 10,000 to 50,000, more preferably 15,000 to 45,000, and still more preferably 20,000 to 40,000. The weight average molecular weight is measured by the gel permeation chromatography and is a value expressed in terms of polystyrene. When the weight average molecular weight of the nylon 6I/6T falls within the aforementioned range, not only the compatibility with the polyester resin is excellent, but also when formed into a container, elution into the contents is suppressed, and the yellowing is effectively suppressed.

A terminal amino group concentration of the nylon 6I/6T is preferably 50 to 350 µmol/g, more preferably 100 to 300 µmol/g, and still more preferably 150 to 250 µmol/g. When the terminal amino group concentration of the nylon 6I/6T falls within the aforementioned range, an action to suppress the yellowing of the regenerated polyester is excellent.

The aforementioned terminal amino group concentration is determined in a manner in which the nylon 6I/6T is precisely weighed and dissolved in a phenol/ethanol (4/1 by volume) solution at 20 to 30° C. while stirring, after the nylon 6I/6T is completely dissolved, the inner wall of the container is washed away with 5 mL of methanol while stirring, and the resultant is subjected to neutral titration with a 0.01 mol/L hydrochloric acid aqueous solution.

The compound (A) may be used alone, or may be used in combination of two or more.

In the present invention, the compound (A) is preferably at least one compound selected from the group consisting of anthranilamide and nylon 6I/6T, more preferably anthranilamide or nylon 6I/6T, and still more preferably anthranilamide.

From the viewpoint of effectively suppressing the yellowing of the regenerated polyester, the content of the compound (A) in the polyester resin composition layer is preferably 0.005 to 3.0 parts by mass, more preferably 0.01 to 1.0 part by mass, and still more preferably 0.05 to 0.5 parts by mass based on 100 parts by mass of the polyester resin (X).

From the viewpoint of effectively suppressing the yellowing of the regenerated polyester, the content of the anthranilamide in the polyester resin composition layer is preferably 0.005 to 1.0 part by mass, more preferably 0.01 to 0.5 parts by mass, and still more preferably 0.05 to 0.3 parts by mass based on 100 parts by mass of the polyester resin (X).

From the viewpoint of effectively suppressing the yellowing of the regenerated polyester, the content of the anthranilic acid in the polyester resin composition layer is preferably 0.005 to 1.0 part by mass, more preferably 0.01 to 0.5 parts by mass, and still more preferably 0.05 to 0.3 parts by mass based on 100 parts by mass of the polyester resin (X).

From the viewpoint of effectively suppressing the yellowing of the regenerated polyester, the content of the nylon 6I/6T in the polyester resin composition layer is preferably 0.01 to 3.0 parts by mass, more preferably 0.03 to 1.0 part by mass, and still more preferably 0.1 to 0.5 parts by mass based on 100 parts by mass of the polyester resin (X).

<Polyamide Resin Layer>

The polyamide resin layer is a layer containing a polyamide resin.

(Polyamide Resin)

Examples of the polyamide resin which the polyamide resin contains include a xylylene group-containing polyamide resin, nylon 6, nylon 66, nylon 666, nylon 610, nylon 11, nylon 12, and mixtures thereof, and the like. In the present invention, by providing the multilayer container with the polyamide resin layer, a high gas barrier property can be brought to the multilayer container. For that reason, it is possible to prevent invasion of oxygen going through a container wall from the outside from occurring and further to prevent vaporization of carbon dioxide of a carbonated beverage to the outside air from occurring. In addition, by using the polyamide resin layer as a layer for bringing about a gas barrier property (gas barrier layer), it becomes easy to separate and recover the polyester resin while making the moldability favorable.

Among the aforementioned respective resins, the xylylene group-containing polyamide resin is preferred in view of the fact that the gas barrier performance is readily improved, and on the occasion of recycle, the polyamide resin is readily separated from the polyester resin composition layer. The xylylene group-containing polyamide resin is a polyamide resin containing a structural unit derived from xylylenediamine.

The xylylene group-containing polyamide resin is one resulting from polycondensation between a diamine containing xylylenediamine and a dicarboxylic acid. As for the structural unit derived from a diamine (diamine unit), the xylylene group-containing polyamide resin contains the structural unit derived from xylylenediamine in a proportion of 50 mol % or more, more preferably 70 mol % or more, still more preferably 80 to 100 mol %, and yet still more preferably 90 to 100 mol %.

Though the xylylenediamine is preferably metaxylylenediamine, paraxylylenediamine, or a mixture thereof, it is more preferably metaxylylenediamine. The diamine unit constituting the xylylene group-containing polyamide resin contains a structural unit derived from metaxylylenediamine in a proportion of preferably 50 mol % or more, more preferably 70 mol % or more, still more preferably 80 to 100 mol %, and yet still more preferably 90 to 100 mol %. When the structural unit derived from metaxylylenediamine in the diamine unit falls within the aforementioned range, the polyamide resin becomes more favorable in terms of a gas barrier property.

Though the diamine unit in the xylylene group-containing polyamide resin is composed of only the structural unit derived from xylylenediamine, it may contain a structural unit derived from other diamine than the xylylenediamine. Here, examples of the other diamine than the xylylenediamine may include aliphatic diamines having a linear or branched structure, such as ethylenediamine, tetramethylenediamine, pentamethylenediamine, 2-methylpentanediamine, hexamethylenediamine, heptamethylenediamine, octamethylenediamine, nonamethylenediamine, decamethylenediamine, dodecamethylenediamine, 2,2,4-trimethylhexamethylenediamine, 2,4,4-trimethyl-hexamethylenediamine, etc.; alicyclic diamines, such as 1,3-bis(aminomethyl)cyclohexane, 1,4-bis(aminomethyl)cyclohexane, 1,3-diaminocyclohexane, 1,4-diaminocyclohexane, bis(4-aminocyclohexyl)methane, 2,2-bis(4-aminocyclohexyl)propane, bis(aminomethyl)decalin, bis(aminomethyl)tricyclodecane, etc.; diamines having an aromatic ring, such as bis(4-aminophenyl) ether, paraphenylenediamine, bis(aminomethyl)naphthalene, etc.; and the like, to which, however, the diamine unit is not limited.

Examples of the compound capable of constituting the dicarboxylic acid unit in the xylylene group-containing polyamide resin may include a, co-linear aliphatic dicarboxylic acids having 4 to 20 carbon atoms, such as succinic acid, glutaric acid, adipic acid, pimelic acid, suberic acid, azelaic acid, sebacic acid, undecane diacid, dodecane diacid, etc.; alicyclic dicarboxylic acids, such as 1,4-cyclohexanedicarboxylic acid, etc.; other aliphatic dicarboxylic acids, such as a dimer acid, etc.; aromatic dicarboxylic acids, such as terephthalic acid, isophthalic acid, orthophthalic acid, xylylenedicarboxylic acid, naphthalenedicarboxylic acid, etc.; and the like, to which, however, the compound is not limited. Among these, α,ω-linear aliphatic dicarboxylic acids having 4 to 20 carbon atoms are preferred, and adipic acid or sebacic acid is more preferred, and from the viewpoint of making the barrier performance favorable, adipic acid is still more preferred.

As for the structural unit derived from a dicarboxylic acid (dicarboxylic acid unit), the xylylene group-containing polyamide resin contains the structural unit derived from adipic acid in a proportion of preferably 50 mol % or more, more preferably 70 mol % or more, still more preferably 80 to 100 mol %, and yet still more preferably 90 to 100 mol %.

In the xylylene group-containing polyamide resin, it is especially preferred that not only 50 mol % or more of the diamine unit is a structural unit derived from xylylenediamine (preferably metaxylylenediamine), but also 50 mol % or more of the dicarboxylic acid unit is a structural unit derived from adipic acid; and it is most preferred that not only 80 mol % or more of the diamine unit is a structural unit derived from xylylenediamine (preferably metaxylylenediamine), but also 80 mol % or more of the dicarboxylic acid unit is a structural unit derived from adipic acid. Not only the polyamide resin having such monomer composition and structural units is favorable in gas barrier property, but also since its molding processability closely resembles a polyester resin, such as a polyethylene terephthalate resin, etc., the processability of the multilayer container is readily made favorable. In this polyamide resin, one or more of a, co-linear aliphatic dicarboxylic acids having 4 to 20 carbon atoms (provided that adipic acid is excluded) are preferably used as the compound constituting the dicarboxylic acid unit other than adipic acid.

As the preferred xylylene group-containing polyamide resin, a polyamide resin, in which 70 mol % or more of the diamine unit is a structural unit derived from xylylenediamine (preferably metaxylylenediamine), 70 to 99 mol % of the dicarboxylic acid unit is a structural unit derived from adipic acid, and 1 to 30 mol % of the dicarboxylic acid unit is a structural unit derived from isophthalic acid, may also be exemplified. It is preferred that the aforementioned polyamide resin is a polyamide resin, in which 80 mol % or more of the diamine unit is a structural unit derived from xylylenediamine (preferably metaxylylenediamine), 80 to 99 mol % of the dicarboxylic acid unit is a structural unit derived from adipic acid, and 1 to 20 mol % of the dicarboxylic acid unit is a structural unit derived from isophthalic acid.

When the isophthalic acid unit is added as the dicarboxylic acid unit, the melting point is decreased, whereby the molding processing temperature can be decreased, and therefore, thermal deterioration during molding can be suppressed. In addition, by delaying the crystallization time, the stretch moldability is improved.

Besides the aforementioned diamine and dicarboxylic acid, as components constituting the xylylene group-containing polyamide resin, a lactam, such as ε-caprolactam, laurolactam, etc.; an aliphatic aminocarboxylic acid, such as aminocaproic acid, aminoundecanoic acid, etc.; or an aromatic aminocarboxylic acid, such as p-aminomethylbenzoic acid, may also be used as the copolymerization component within a range where the effects of the present invention are not impaired.

It is preferred that the xylylene group-containing polyamide resin is produced through a polycondensation reaction in the molten state (hereinafter also referred to as "melt polycondensation"). For example, it is preferred that the polyamide resin is produced by a method in which a nylon salt composed of a diamine and a dicarboxylic acid is subjected to temperature rise by means of pressurization in the presence of water and polymerized in the molten state while removing the water added and condensed water. In addition, the polyamide resin may also be produced by a method in which the diamine is added directly to the dicarboxylic acid in the molten state, and the contents are polycondensed under atmospheric pressure. In this case, in order to hold the reaction system in a uniform liquid state, it is preferred that the diamine is continuously added to the dicarboxylic acid, and meanwhile, the polycondensation is allowed to proceed while subjecting the reaction system to temperature rise such that the reaction temperature does not drop lower than the melting points of the produced oligoamide and polyamide. In addition, in the xylylene group-containing polyamide resin, the molecular weight may also be increased by further subjecting the product obtained through melt polycondensation to solid-phase polymerization, as the need arises.

The xylylene group-containing polyamide resin may be subjected to polycondensation in the presence of a phosphorus atom-containing compound. When the xylylene group-containing polyamide resin is subjected to polycondensation in the presence of a phosphorus atom-containing compound, the processing stability at the time of melt molding is enhanced, and coloration is readily suppressed.

Preferred specific examples of the phosphorus atom-containing compound include a hypophosphorous acid compound (also referred to as a phosphonic acid compound or a phosphonous acid compound) and a phosphorous acid compound (also referred to as a phosphonic acid compound), to which, however, the compound is not particularly limited. Though the phosphorus atom containing-compound may be an organic metal salt, above all, an alkali metal salt is preferred.

Specific examples of the hypophosphorous acid compound include hypophosphorous acid; metal salts of hypophosphorous acid, such as sodium hypophosphite, potassium hypophosphite, lithium hypophosphite, calcium hypophosphite, etc.; hypophosphorous acid compounds, such as ethyl hypophosphite, dimethylphosphinic acid, phenylmethylphosphinic acid, phenylphosphonous acid, ethyl phenylphosphonite, etc.; metal salts of phenylphosphonous acid, such as sodium phenylphosphonite, potassium phenylphosphonite, lithium phenylphosphonite, etc.; and the like.

Specific examples of the phosphorous acid compound include phosphorous acid and pyrophosphorous acid; metal salts of phosphorous acid, such as sodium hydrogen phosphite, sodium phosphite, potassium phosphite, calcium phosphite, etc.; phosphorous acid compounds, such as triethyl phosphite, triphenyl phosphite, ethylphosphonic acid, phenylphosphonic acid, diethyl phenylphosphonate, etc.; sodium ethylphosphonate; potassium ethylphosphonate; metal salts of phenylphosphonic acid, such as sodium phenylphosphonate, potassium phenylphosphonate, lithium phenylphosphonate, etc.; and the like.

Among those, the phosphorus atom-containing compound may be used alone, or may be used in combination of two or more. Among those, from the viewpoint of an effect for promoting the polymerization reaction of the polyamide resin as well as the viewpoint of an effect for preventing coloration from occurring, metal salts of hypophosphorous acid, such as sodium hypophosphite, potassium hypophosphite, lithium hypophosphite, calcium hypophosphite, etc. are preferred, with sodium hypophosphite being more preferred.

It is preferred that the polycondensation of the xylylene group-containing polyamide resin is conducted in the presence of a phosphorus atom-containing compound and an alkali metal compound. In order to prevent coloration of the polyamide resin during the polycondensation from occurring, it is necessary to make a sufficient amount of the phosphorus atom-containing compound exist. However, if the use amount of the phosphorus atom-containing compound is excessively large, there is a concern that an amidation reaction rate is excessively promoted, so that gelation of the polyamide resin is brought. For that reason, from the viewpoint of regulating the amidation reaction rate, it is preferred to make an alkali metal compound coexist.

Though the alkali metal compound is not particularly limited, preferably, specific examples thereof may include alkali metal hydroxides and alkali metal acetates. Examples of the alkali metal hydroxide may include lithium hydroxide, sodium hydroxide, potassium hydroxide, rubidium hydroxide, and cesium hydroxide; and examples of the alkali metal acetate may include lithium acetate, sodium acetate, potassium acetate, rubidium acetate, and cesium acetate.

In the case of using the alkali metal compound on the occasion of polycondensation of the polyamide resin, from the viewpoint of suppressing the formation of a gel, the use amount of the alkali metal compound is within a range of preferably from 0.5 to 1, more preferably from 0.55 to 0.95, and still more preferably from 0.6 to 0.9 in terms of a value obtained by diving the molar number of the alkali metal compound by the molar number of the phosphorus atom-containing compound.

Though a number average molecular weight of the polyamide resin is properly selected according to an application of the multilayer container or the molding method, from the viewpoint of moldability or strength of the multilayer container, it is preferably 10,000 to 60,000. In addition, from the aforementioned viewpoint, the number average molecular weight of the polyamide resin is more preferably 11,000 to 50,000.

The number average molecular weight of the polyamide resin is calculated according to the following equation (X).

Number average molecular weight=2×1,000,000/ ([COOH]+[NH$_2$])     (X)

In the equation, [COOH] represents a terminal carboxy group concentration (µmol/g) in the polyamide resin; and [NH$_2$] represents a terminal amino group concentration (µmol/g) in the polyamide resin.

Here, as the terminal amino group concentration, a value obtained by subjecting a solution of the polyamide resin in a phenol/ethanol mixed solution to neutralization titration with a dilute hydrochloric acid aqueous solution, followed by calculation is used; and as the terminal carboxy group concentration, a value obtained by subjecting a solution of the polyamide in benzyl alcohol to neutralization titration with a sodium hydroxide aqueous solution, followed by calculation is used.

In the present invention, from the viewpoint of suppressing the yellowing of the regenerated polyester resin, an amino group concentration of the polyamide resin (Y) is preferably 50 µmol/g or less, more preferably 45 µmol/g or less, still more preferably 40 µmol/g or less, still more preferably 30 µmol/g or less, and especially preferably 20 µmol/g or less.

The amino group concentration of the polyamide resin (Y) is determined in a manner in which the polyamide resin is precisely weighed and dissolved in a phenol/ethanol (4/1 by volume) solution at 20 to 30° C. while stirring, after the polyamide resin is completely dissolved, the inner wall of the container is washed away with 5 mL of methanol while stirring, and the resultant is subjected to neutral titration with a 0.01 mol/L hydrochloric acid aqueous solution.

Though a method of regulating the amino group concentration of the polyamide resin (Y) is not particularly limited, the amino group concentration can be controlled low by a method in which a charge ratio (molar ratio) of the diamine and the dicarboxylic acid is regulated to undergo the polycondensation reaction; a method in which a monocarboxylic acid capable of capping an amino group is charged together with the diamine and the dicarboxylic acid to undergo the polycondensation reaction; a method in which after undergoing the polycondensation reaction, the resultant is allowed to react with a carboxylic acid capable of capping an amino group; or the like.

(Transition Metal)

In the present invention, for the purpose of inducing an oxidation reaction of the polyamide resin (Y) to enhance an oxygen absorption ability and to more enhance the gas barrier property, it is also preferred that the polyamide resin layer contains a transition metal.

The transition metal is preferably at least one selected from the group consisting of a transition metal belonging to the Group VIII of the Periodic Table, manganese, copper, and zinc, and from the viewpoint of revealing oxygen absorption ability, the transition metal is more preferably at least one selected from the group consisting of cobalt, iron, manganese, and nickel, with cobalt being still more preferred.

The transition metal is used as an elemental substance, and besides, it is used in a form of a low-valence oxide, an inorganic acid salt, an organic acid salt, or a complex salt each containing the aforementioned metal. Examples of the inorganic acid salt include halides, such as a chloride, a bromide, etc., carbonates, sulfates, nitrates, phosphates, silicates, and the like. Meanwhile, examples of the organic acid salt include carboxylates, sulfonates, phosphonates, and the like. In addition, transition metal complexes with a β-diketone or a β-keto acid ester or the like can also be utilized.

In the present invention, from the viewpoint of favorably revealing oxygen absorption ability, it is preferred to use at least one selected from the group consisting of a carboxylate, a carbonate, an acetylacetonate complex, an oxide, and a halide each containing a transition metal; it is more preferred to use at least one selected from the group consisting of an octanoate, a neodecanoate, a naphthenate, a stearate, an acetate, a carbonate, and an acetylacetonate complex each containing a transition metal; and it is still more preferred to use a cobalt carboxylate, such as cobalt octanoate, cobalt naphthenate, cobalt acetate, cobalt stearate, etc.

The aforementioned transition metal may be used alone, or may be used in combination of two or more.

From the viewpoints of enhancing the gas barrier property and suppressing the yellowing of the regenerated polyester resin, the content of the transition metal is preferably 0.0001 to 1.0 part by mass, more preferably 0.001 to 0.1 parts by mass, and still more preferably 0.003 to 0.03 parts by mass based on 100 parts by mass of the polyamide resin (Y). In the case of using a carboxylate containing a transition metal, the content of the transition metal means the content of the transition metal per se in the compound containing the foregoing transition metal.

(Other Components)

The polyester resin composition layer and the polyamide resin layer may contain various additive components. Examples of the additive component include a coloring agent, a heat stabilizer, a light stabilizer, a moistureproof agent, a waterproof agent, a lubricant, a spreader, and the like.

Above all, it is preferred that the polyester resin composition layer contains a coloring agent, and from the standpoint of functioning as a complementary color against the yellowing, it is preferred that the polyester resin composition layer contains a blue or purple coloring agent. The content of the blue or purple coloring agent in the polyester resin composition layer is preferably 0.1 to 100 ppm, more preferably 0.5 to 50 ppm, and still more preferably 1 to 30 ppm relative to the polyester resin.

Each of the polyester resin composition layer and the polyamide resin layer may contain other resin component than the polyester resin and the polyamide resin within a range where the object of the present invention is not deviated. In the polyester resin composition layer, the polyester resin serves as a main component, and specifically, the content of the polyester resin is preferably 80 to 100% by mass, and more preferably 90 to 100% by mass relative to the resin amount of the entire layer.

The content of the polyamide resin in the polyamide resin layer is preferably 10 to 100% by mass, more preferably 20 to 100% by mass, and still more preferably 25 to 100% by mass relative to the resin amount of the entire layer. In order to improve delamination resistance between the polyester resin composition layer and the polyamide resin layer (resistance to layer separation between the polyester resin composition layer and the polyamide resin layer), in addition to the polyamide resin, a polyester resin may be added in the polyamide resin layer. In this case, the content of the polyamide resin in the polyamide resin layer is preferably 10 to 50% by mass, and more preferably 20 to 45% by mass of the entire resin, and the content of the polyester resin is preferably 50 to 90% by mass, and more preferably 55 to 80% by mass of the entire resin.

The multilayer container of the present invention is preferably a hollow container, and in the case where the multilayer container is a hollow container, a body thereof has at least a multilayer laminated structure. In the body, a ratio of a thickness (W) of the polyester resin composition layer to a thickness (S) of the polyamide resin layer (thickness ratio: W/S) is preferably 2.5 or more and 200 or less. The thickness of the polyester resin composition layer means an average thickness, and in the body, in the case where the polyester resin composition layer is composed of plural layers, the thicknesses of the plural layers are averaged to determine an average thickness per layer. The thickness of the polyamide resin layer is also the same.

When the thickness ratio W/S is 2.5 or more, in a fractionation process in the production method of a regenerated polyester resin, particularly air classification or gravity separation, it is easy to fractionate the polyamide resin from the polyester resin, and hence, such is preferred. In addition, when the thickness ratio W/S is 200 or less, the gas barrier performance of the hollow container is easily secured, and the storage performance of the contents is improved, and hence, such is preferred.

From the viewpoint of making the gas barrier property of the hollow container favorable while enhancing the fractionation property in the fractionation process, the thickness ratio (W/S) is more preferably 3 to 50, and still more preferably 4 to 15.

In the case where the multilayer container is a hollow container, a total thickness in the body of the hollow container (namely, a total thickness of all of the layers of the body) is within a range of preferably from 100 µm to 5 mm, more preferably from 150 µm to 3 mm, and still more preferably from 300 µm to 2 mm. In addition, the thickness (W) of each polyester resin composition layer is within a range of preferably from 50 µm to 2 mm, more preferably from 75 µm to 1 mm, and still more preferably from 100 µm to 500 µm. The thickness (5) of each polyamide resin layer is within a range of preferably from 1 to 200 µm, more preferably from 3 to 100 µm, and still more preferably from 10 to 50 µm. In the present invention, by allowing the polyamide resin layer to fall within such a thickness range, in the fractionation process as mentioned later, the polyamide resin is readily fractionated from the polyester resin while securing the gas barrier property.

Though the multilayer container of the present invention is one having at least one layer of each of the polyester resin composition layer and the polyamide resin layer, it may have other layer than the polyester resin composition layer and the polyamide resin layer. Specifically, examples of the other layer include a resin layer or an adhesive layer, which is made to intervene between the polyester resin composition layer and the polyamide resin layer and adheres these resin layers to each other. However, from the viewpoint of improving heat resistance or molding processability as well as a fractionation property at the time of recycle, it is preferred that the resin layer or the adhesive layer is made to not intervene between the polyester resin composition layer and the polyamide resin layer.

It is preferred that the multilayer container of the present invention has two or more layers of the polyester resin composition layer, and it is more preferred that the multilayer container has the polyamide resin layer sandwiched directly or indirectly between two layers of the polyester resin composition layer. In this case, the multilayer container may have at least one other layer between the polyester resin composition layer and the polyamide resin layer, and the multilayer container may have at least one other layer on an opposite surface of the polyester resin composition layer to the surface on which the polyamide resin layer is provided directly or indirectly, to which, however, the multilayer container is not particularly limited.

That is, the multilayer container is preferably one having a multilayer laminated structure in which at least one polyamide resin layer to be disposed between a pair of the polyester resin composition layers is contained as an interlayer. In addition, in the multilayer laminated structure, it is more preferred that an outermost layer and an innermost layer are the polyester resin composition layer. When the polyester resin composition layer is abbreviated as "PES", and the polyamide resin layer is abbreviated as "PA", the multilayer container preferably has a multilayer laminated structure composed of a three-layer structure of "PES/PA/PES" or a five-layer structure of "PES/PA/PES/PA/PES", and more preferably has a three-layer structure of "PES/PA/PES" having the polyamide resin layer sandwiched between the polyester resin composition layers, to which, however, the multilayer container is not limited.

The multilayer container of the present invention is preferably a hollow container, more preferably a packaging container for liquid, which is used upon being filled with a liquid in the inside of a hollow container, and still more preferably a packaging container for beverage. Examples of the liquid to be filled in the inside may include various products, such as beverages, e.g., water, carbonated water, oxygen water, hydrogen water, milk, dairy products, juices, coffee, coffee beverages, carbonated soft drinks, teas, alcoholic beverages, etc.; liquid seasonings, e.g., sauce, soy sauce, syrup, sweet sake, dressing, etc.; chemicals, e.g., agrochemicals, insecticides, etc.; medical and pharmaceutical products; detergents; and the like. In particular, there are preferably exemplified beverages or carbonated beverages which are liable to be deteriorated in the presence of oxygen, for example, beers, wines, coffee, coffee beverages, fruit juices, carbonated soft drinks, carbonated water, or teas.

The multilayer container of the present invention is excellent in oxygen barrier property and hence, is preferred. The oxygen barrier property of the container (cc/(bottle·0.21 atm·day)) is preferably 0.040 or less, more preferably 0.035 or less, and still more preferably 0.030 or less. The aforementioned oxygen barrier property is on a basis of the container fabricated in each of the Examples as mentioned later.

The oxygen barrier property of the container can be evaluated through an oxygen permeability test by the MOCON method in conformity with ASTM D3985. For the measurement, OX-TRAN2/61, manufactured by MOCON Inc. is used; 100 mL of water is filled in the obtained 500-mL bottle; nitrogen at 1 atm is made to flow into the inside of the bottle at a rate of 20 mL/min under a condition of an oxygen partial pressure of 0.21 atm at a temperature of 23° C. and at a bottle internal humidity of 100% RH, and an external humidity of 50% RH; and oxygen contained in the nitrogen after flowing in the inside of the bottle is detected by a coulometric sensor.

<Production Method of Multilayer Container>

In the present invention, though the production method of the multilayer container is not particularly limited, it preferably includes the following step (S1) and step (S2) in this order.

Step (S1): A step of previously mixing the polyester resin (X) and the amino group-containing compound (A) having a yellowing-suppressing ability, to prepare a polyester resin mixture or a polyester resin composition.

Step (S2); A step of extruding the polyester resin mixture or the polyester resin composition from a first extruder and the polyamide resin composition containing the polyamide resin (Y) from a second extruder, respectively, followed by molding.

In the step (S1), the polyester resin (X) and the compound (A) are mixed to prepare a polyester resin mixture or a polyester resin composition. The mixing may be either dry blending or melt blending (melt kneading). That is, the polyester resin (X) and the compound (A) may be subjected to dry blending to prepare a polyester resin mixture; or the polyester resin (X) and the compound (A) may be subjected to melt blending to prepare a polyester resin composition. Above all, from the viewpoint of minimizing thermal history, the dry blending is preferred. Here, the dry blending means mechanical mixing in a particulate or pellet-like form. For mixing, a mixing device, such as a tumbler mixer, a ribbon mixer, a Henschel mixer, a Banbury mixer, etc., may be used. Alternatively, on the occasion of subjecting to molding processing, by supplying a predetermined amount of the compound (A) by a feeder (or a liquid addition device) different from a supply feeder of the polyester resin (X), a polyester resin mixture may be formed immediately before the step (S2).

In the case of melt kneading the polyester resin (X) and the compound (A), though a temperature in melt kneading is not particularly limited, from the viewpoint that the polyester resin is thoroughly melted and thoroughly kneaded with the compound (A), it is preferably 300 to 255° C., more preferably 290 to 260° C., and still more preferably 285 to 265° C. In addition, though a time of melt kneading is not particularly limited, from the viewpoint that the polyester resin (X) and the compound (A) are uniformly mixed, it is preferably 10 to 600 seconds, more preferably 20 to 400 seconds, and still more preferably 30 to 300 seconds. Though a device which is used for melt kneading is not particularly limited, examples thereof include an open type mixing roll, a non-open type Banbury mixer, a kneader, a continuous kneading machine (e.g., a uniaxial kneading machine, a biaxial kneading machine, a multiaxial kneading machine, etc.), and the like.

In the step (S2), the polyester resin composition is extruded from a first extruder, and the polyamide resin composition is extruded from a second extruder, followed by molding. More specifically, the step (S2) is preferably a step of molding a multilayer preform by means of extrusion molding, coinjection molding, compression molding, or the like.

In the extrusion molding, the polyester resin composition and the polyamide resin composition are subjected to coextrusion molding to mold a multilayer preform.

In the coinjection molding, the polyester resin composition and the polyamide resin composition are extruded into dies, respectively and then subjected to coinjection molding to mold a multilayer preform.

In the compression molding, there is exemplified a method in which the polyamide resin composition in the heat-melted state is intermittently extruded into an extrusion channel where the polyester resin composition in the heat-melted state flows, and the polyester resin composition surrounding the substantially whole of the extruded polyamide resin composition is extruded from an extrusion port of the extrusion channel and properly supplied as a molten resin molding material into a molding die, followed by compression molding to mold a multilayer preform.

In the present invention, it is preferred that after the aforementioned step (S2), a step of subjecting the multilayer preform to blow molding is included.

The multilayer preform (multilayer parison) obtained in the step (S2) may be molded by means of direct blowing, or may be molded by means of stretch blowing, to which, however, the molding is not particularly limited.

Among these, as for the production method of the multilayer container of the present invention, in the step (S2), a method in which the multilayer preform obtained by extrusion molding is subjected to direct blow molding, or a method in which the multilayer preform obtained by coinjection molding is subjected to stretch blow molding, is preferred, and a method in which the multilayer preform obtained by coinjection molding is subjected to biaxial stretch blow molding is more preferred. As for a condition of biaxial stretch blow molding, it is preferred to set a preform heating temperature to 95 to 110° C., a primary blow pressure to 0.5 to 1.2 MPa, and a secondary blow pressure to 2.0 to 2.6 MPa, respectively. In this way, the generation of thickness unevenness or stretch unevenness is suppressed, and a multilayer container with excellent strength can be obtained.

[Production Method of Single-Layer Container]

The method for producing a single-layer container of the present invention includes the following step (T1) and step (T2) in this order. In the following description, the single-layer container obtained by the method for producing a single-layer container of the present invention is also referred to as the single-layer container of the present invention.

Step (T1): A step of previously melt kneading a polyester resin (X) and an amino group-containing compound (A) having a yellowing-suppressing ability, to prepare a polyester resin composition.

Step (T2): A step of melt kneading the polyester resin composition and a polyamide resin (Y), followed by molding.

The polyester resin (X) and the amino group-containing compound (A) having a yellowing-suppressing ability, both of which are used in the step (T1), are the same as those used in the multilayer container of the present invention and the production method thereof as described above, and preferred ranges are also the same.

Preferred contents of the compound (A), anthranilamide, anthranilic acid, and nylon 6I/6T relative to the polyester resin (X) are those described for the multilayer container.

In the step (T1), though the temperature in melt kneading of the polyester resin (X) and the compound (A) is not particularly limited, from the viewpoint that the polyester resin is thoroughly melted and thoroughly kneaded with the compound (A), it is preferably 300 to 255° C., more preferably 290 to 260° C., and still more preferably 285 to 265° C. In addition, though a time of melt kneading is not particularly limited, from the viewpoint that the polyester resin (X) and the compound (A) are uniformly mixed, it is preferably 10 to 600 seconds, more preferably 20 to 400 seconds, and still more preferably 30 to 300 seconds. Though a device which is used for melt kneading is not particularly limited, examples thereof include an open type mixing roll, a non-open type Banbury mixer, a kneader, a continuous kneading machine (e.g., a uniaxial kneading machine, a biaxial kneading machine, a multiaxial kneading machine, etc.), and the like.

The polyamide resin (Y) which is used in the step (T2) is the same as the polyamide (Y) used in the multilayer container and the production method thereof, and preferred range is also the same.

Though a condition of the melt kneading of the polyester resin composition and the polyamide resin (Y) is not particularly limited so long as it is a condition under which the polyester resin composition and the polyamide resin (Y) are melt kneaded, a temperature thereof is preferably 300 to 255° C., more preferably 290 to 260° C., and still more preferably 285 to 265° C.

Though a time of melt kneading is not particularly limited, from the viewpoint that the polyester resin (X) and the compound (A) are uniformly mixed, it is preferably 10 to 600 seconds, more preferably 20 to 400 seconds, and still more preferably 30 to 300 seconds.

From the viewpoint of exhibiting a favorable gas barrier property, the content of the polyamide resin is preferably 0.5 to 15 parts by mass, more preferably 1 to 10 parts by mass, and still more preferably 1.5 to 8 parts by mass based on 100 parts by mass of the polyester resin composition.

In the single-layer container of the present invention, as compared with the case of melt kneading the polyester resin (X) and the polyamide resin (Y) and then adding the compound (A), or the case of simultaneously melt kneading the polyester resin (X), the polyamide resin (Y), and the compound (A), when the polyester resin (X) and the compound (A) are previously melt kneaded, and the polyamide (Y) is then melt kneaded, a larger amount of the compound (A) exists in the polyester resin (X), and the acetaldehyde formed in the polyester resin (X) is trapped with the compound (A) before reacting with the polyamide resin (Y), and therefore, it may be conjectured that the yellowing of the regenerated polyester resin is suppressed as a whole.

In the single-layer container of the present invention, the step (T2) is preferably a step of molding a preform by means of extrusion molding, injection molding, compression molding, or the like.

It is preferred that a step of subjecting the resulting preform to blow molding is further included. The preform obtained in the step (T2) may be molded by means of direct blowing, or may be molded by means of stretch blowing, to which, however, the molding is not particularly limited.

Above all, it is preferred to obtain the single-layer container by subjecting the preform obtained by means injection molding to biaxial stretch blow molding.

In the case where the single-layer container is a hollow container, a thickness in the body of the hollow container is within a range of preferably from 100 μm to 5 mm, more preferably from 150 μm to 3 mm, and still more preferably from 300 μm to 2 mm.

The single-layer container of the present invention is preferably a hollow container, more preferably a packaging container for liquid, which is used upon being filled with a liquid in the inside of a hollow container, and still more preferably a packaging container for beverage. Examples of the liquid to be filled in the inside may include various products, such as beverages, e.g., water, carbonated water, oxygen water, hydrogen water, milk, dairy products, juices, coffee, coffee beverages, carbonated soft drinks, teas, alcoholic beverages, etc.; liquid seasonings, e.g., sauce, soy sauce, syrup, sweet sake, dressing, etc.; chemicals, e.g., agrochemicals, insecticides, etc.; medical and pharmaceutical products; detergents; and the like. In particular, there are preferably exemplified beverages or carbonated beverages which are liable to be deteriorated in the presence of oxygen, for example, beers, wines, coffee, coffee beverages, fruit juices, carbonated soft drinks, carbonated water, or teas.

The single-layer container of the present invention is excellent in oxygen barrier property and hence, is preferred. The oxygen barrier property of the container (cc/(bottle·0.21 atm·day)) is preferably 0.040 or less, more preferably 0.038 or less, and still more preferably 0.035 or less. The oxygen barrier property of the single-layer container is measured by the same method as in the multilayer container.

[Production Method of Regenerated Polyester Resin]

As described above, the multilayer container of the present invention and the single-layer container of the present invention are suitable for recycle, and it is possible to produce the regenerated polyester resin using the multilayer container or single-layer container of the present invention as a raw material. In the present invention, the production method of the regenerated polyester resin is not particularly limited so long as it is a method in which the polyester resin is recovered from the multilayer container or single-layer container of the present invention to produce the regenerated polyester resin.

The production method of the regenerated polyester resin from the multilayer container is preferably a method in which the polyamide resin constituting the polyamide resin layer is removed from the aforementioned multilayer container to recover the polyester resin constituting the polyester resin composition layer, thereby forming the instant polyester resin as the regenerated polyester resin. The production method of the regenerated polyester resin from the multilayer container is not limited to the aforementioned method but may also be a method in which the regenerated polyester is produced without going through the step of removing the polyamide resin. In addition, in the case of the single-layer container, the regenerated polyester resin can be produced by the same method as the production method of the regenerated polyester resin from the multilayer container, except for not including the step of removing the polyamide resin.

The production method of the regenerated polyester resin of the present invention is hereunder described in detail.

In the present production method, as the multilayer container and the single-layer container, in general, a spent product is used, but an unspent product may also be used. Examples of the spent multilayer container and the single-layer container include one resulting from recovery after being once distributed in the market.

In the present production method, first of all, in the case where a lid is installed in the multilayer container or single-layer container, it is preferred that the lid is taken away from the multilayer container or single-layer container, and thereafter, in the multilayer container, a step of removing the polyamide resin constituting the polyamide resin layer (hereinafter also referred to as "removal step") is conducted. In addition, in the case where the lid is already taken away from the multilayer container, it is preferred that the multilayer container from which the lid has been taken away is subjected to the removal step.

<Removal Step>

Though the removal step is not particularly limited so long as it is a step of removing the polyamide resin constituting the polyamide resin layer to selectively take away the polyester resin, for example, it is preferably a step of milling the multilayer container and then fractionating the polyester resin and the polyamide resin from each other.

The milling of the multilayer container can be conducted using a milling machine, such as a uniaxial milling machine, a biaxial milling machine, a triaxial milling machine, a cutter mill, etc. The milled product obtained by milling is, for example, in a flake-shape, powder-shape, or block-shape form. However, in the multilayer container, a portion having a thin multilayer laminated structure having a thickness of several mm or less, such as a body, is the majority, and therefore, in general, the majority of the milled product is in a flake-shape form. The milled product in a flake-shape form refers to one in the flaky or flat state having a thickness of about 2 mm or less.

In the multilayer laminated structure, the polyester resin composition layer and the polyamide resin layer are integrated from the structural standpoint. However, in general, these do not adhere to each other, but in the milling step, the polyester resin and the polyamide resin are readily separated as a different milled product from each other. In addition, when the milled product is made flaky, it is flung up by an air flow of air classification as mentioned later and easily separated into the polyester resin and the polyamide resin, respectively.

However, the polyester resin and the polyamide resin cannot be always completely separated from each other in the milling step, but the milled product is separated into a material having a relatively high content of the polyester resin, and a material having a relatively low content of the polyester resin and having a relatively high content of the polyamide resin. As a matter of convenience for explanation, the material having a relatively high content of the polyester resin is referred to simply as the polyester resin, and the material having a relatively high content of the polyamide resin is referred to simply as the polyamide resin.

As described above, the milled product is fractionated into the polyester resin and the polyamide resin (fractionation step). As the fractionation method, it is preferred to adopt gravidity classification utilizing a difference in specific gravity between the polyester resin and the polyamide resin.

Specifically, examples of the gravity classification include air classification of conducting classification of the milled product by a wind force. Examples of the air classification include a method in which in a separation device capable of generating a rotary air flow in the inside thereof, the milled product exposed to the air flow generated in the separation device is fractionated and recovered as one having a large specific gravity or bulk density and naturally dropping due to the own weight and one having a small specific gravity or bulk density and being flung up by the air flow, respectively.

According to this method, the milled product of the polyester resin naturally drops due to the own weight, whereas the milled product of the polyamide resin is flung up, and therefore, it becomes possible to fractionate and recover the polyester resin and the polyamide resin, respectively.

In such air classification, the same milled product may be repeatedly subjected to the same operation. For example, the milled product which has naturally dropped may be further subjected to air classification, thereby increasing the content of the polyester resin in the regenerated polyester resin.

The fractionation method is not limited to the air classification, and examples thereof include a method in which the milled product is dipped in a liquid, such as water, etc., and fractionated due to a difference in specific gravity against the liquid between the milled products; and a method in which a fixed vibration is given to the milled product, thereby separating and fractionating the milled products having a different specific gravity from each other; and the like.

<Granulation Step>

In order to make handling at the time of molding processing or the like easy, it is preferred that the recovered polyester resin (regenerated polyester resin) is granulated to form a pellet.

Though the granulation may be conducted either before or after a crystallization/solid-phase polymerization step as mentioned later, it is suitable to conduct the granulation before the crystallization/solid-phase polymerization step. By conducting the granulation before the crystallization/solid-phase polymerization step, the handling property in the crystallization/solid-phase polymerization step becomes favorable, too.

In the granulation step, it is preferred that the milled product is plasticized and granulated by means of melt blending. Though examples of a granulation device for undergoing the plasticization and granulation include a uniaxial extruder, a biaxial extruder, a multiaxial extruder, and the like, any known devices can be used. A shape of the pellet is preferably a columnar shape, a spherical shape, or an oval spherical shape.

It is preferred that the granulation is, for example, conducted by a method in which the plasticized regenerated polyester resin is extruded into a strand form and cut by a pelletizer while cooling with a water tank, thereby undergoing pelletization. The pellet taken away from the water tank is generally dried for the purpose of removing the moisture attached onto the surface thereof.

<Crystallization/Solid-Phase Polymerization Step>

It is preferred that the recovered regenerated polyester resin is subjected to a crystallization/solid-phase polymerization step of conducting crystallization, solid-phase polymerization, or both of them. However, in the present step, it is more preferred to conduct both of crystallization and solid-phase polymerization. Though it is preferred to apply the crystallization/solid-phase polymerization step to the aforementioned pelletized polyester resin, it may also be applied to a non-pelletized material (for example, the milled product).

In the case of conducting both of crystallization and solid-phase polymerization, it is preferred that after crystallization of the regenerated polyester resin, the solid-phase polymerization is applied.

The crystallization of the regenerated polyester resin is conducted by holding the polyester resin under fixed heating. It is preferred to undergo the crystallization by heating the polyester resin at, for example, 100 to 230° C. When the regenerated polyester resin is crystallized, fusion of the regenerated polyester resins with each other or attachment of the polyester resin onto the inner surface of the device at the time of solid-phase polymerization or molding processing is prevented from occurring.

It is preferred that the solid-phase polymerization is conducted at a temperature of [(melting point of polyester resin)−80° C.] or higher and lower than the melting point of the polyester resin for a fixed time. When the temperature is controlled to lower than the melting point of the polyester resin, melting of the regenerated polyester resin is prevented from occurring, and for example, a lowering of work efficiency to be caused due to attachment of the regenerated polyester resin onto the surface of the device is prevented from occurring. In addition, when the temperature is controlled to [(melting point of polyester resin)−80° C.] or higher, the polymerization proceeds at a sufficient polymerization rate, so that desired physical properties are readily obtained.

The solid-phase polymerization may be carried out under vacuum, and it may also be carried out in an inert gas stream of nitrogen, argon, or the like. In the case of carrying out the solid-phase polymerization under vacuum, a degree of vacuum is preferably 1.0 torr or less, more preferably 0.5 torr or less, and still more preferably 0.1 torr or less. In addition, in carrying out the solid-phase polymerization either under vacuum or in an inert gas stream of nitrogen, argon, or the like, it is preferred to make the concentration of oxygen retaining in the system low as far as possible, and the concentration of oxygen is preferably 300 ppm or less, and more preferably 30 ppm or less. By regulating the concentration of oxygen to 30 ppm or less, an appearance failure, such as yellowing, hardly occurs.

In the case of carrying out the solid-phase polymerization under vacuum, it is preferred to keep the heat transfer uniform while always repeating stirring or mixing of the regenerated polyester resin. In the case of carrying out the solid-phase polymerization in the presence of an inert gas, it is preferred to always keep the surface of the polyester resin in a contacting state with a dry gas in a dry gas stream.

Examples of a solid-phase polymerization device for undergoing the crystallization/solid-phase polymerization step include a tumbler type batchwise device installed with a heating jacket, a dry silo type device equipped with inert gas stream equipment, a crystallization device or reactor equipped with a stirring blade and a discharge screw in the inside thereof, and the like. It is preferred to undergo the crystallization and the solid-phase polymerization continuously or simultaneously by the same device.

Though a heating time of the solid-phase polymerization is properly determined taking into consideration the device and other conditions, a time for which the polyester resin obtains sufficient physical properties is enough.

In the solid-phase polymerization, the regenerated polyester resin is held at a high temperature for a long time, and therefore, there is a case where if impurities are present in the regenerated polyester resin, the quality, such as color tone, is deteriorated. In the aforementioned removal step, it is preferred that a majority of the polyamide resin is removed. In this case, the deterioration of the quality which is possibly generated at the time of solid-phase polymerization is minimized.

In the production method of the regenerated polyester resin of the present invention, other step than the above-explained steps may be carried out, and in order to remove the contents attached in the inside of the multilayer container or single-layer container, a washing step may be conducted. For washing, rinse with a liquid is preferred, and washing with water or washing with an alkaline aqueous solution, or both of them may be conducted.

Though the washing may be conducted either before or after the multilayer container or single-layer container is milled into a milled product, it is preferably conducted before conducting any one of granulation, crystallization, and solid-phase polymerization. Furthermore, the washing step may be conducted simultaneously with the milling step using a milling machine called a wet milling machine, in which washing and milling are conducted at the same time.

In the case where the washing step is conducted, a drying step may be conducted after the washing step. By undergoing the drying step, the amount of moisture of the regenerated polyester resin obtained by the present method can be reduced, and therefore, it becomes possible to provide a high-quality regenerated polyester resin which is high in heat stability or the like. The drying step can be, for example, conducted by blowing air or hot air by a dryer, or the like.

In the case where the production method of the regenerated polyester resin includes the removal step of the polyamide resin, in the obtained regenerated polyester resin, the content of the polyamide resin is preferably less than 1% by mass, more preferably less than 0.8% by mass, and still more preferably less than 0.6% by mass. In this way, by reducing the content of the polyamide resin, deterioration in color tone or the like, to be caused due to the polyamide resin, is prevented from occurring, and it becomes easy to make the quality of the regenerated polyester resin favorable.

The multilayer container and the single-layer container of the present invention are excellent in transparency and hence, are preferred.

EXAMPLES

The present invention is hereunder more specifically described by reference to the Examples and Comparative Examples, but it should be construed that the present invention is by no means limited to these Examples.

Polyester resins and additives and so on used in the Examples and Comparative Examples are as follows.

Polyester resin: Polyethylene terephthalate (intrinsic viscosity: 0.83 dL/g, melting point: 255° C.), trade name: RT543C, manufactured by Nippon Unipet Co., Ltd.

2-Anthranilamide: manufactured by Tokyo Chemical Industry Co., Ltd.

2-Anthranilic acid: manufactured by Tokyo Chemical Industry Co., Ltd.

ADEKA STAB LA-57: Tetrakis(2,2,6,6-tetramethyl-4-piperidyl)butane-1,2,3,4-tetracarboxylate, manufactured by ADEKA Corporation ADEKA STAB LA-77Y: Bis(2,2,6,6-tetramethyl-4-piperidyl)sebacate, manufactured by ADEKA Corporation Trimethylolpropane: manufactured by Tokyo Chemical Industry Co., Ltd. 1,3-BAC: 1,3-Bis(aminomethyl)cyclohexane, manufactured by Mitsubishi Gas Chemical Company, Inc.

Triple A: 2-Anthranilamide/coloring agent/spreader mixture, trade name; Triple A-1+, manufactured by Color Matrix Senz AA: (Nylon 6I/6T)/coloring agent/spreader mixture, trade name: Senz AA, manufactured by REPI Dimethyl terephthalate: manufactured by Kanto Chemical Co., Inc.

BHET: Bis(2-hydroxyethyl) terephthalate, manufactured by Kanto Chemical Co., Inc.

Methyl benzoate: manufactured by Kanto Chemical Co., Inc.

Benzyl benzoate: manufactured by Kanto Chemical Co., Inc.

γ-Butyrolactone: manufactured by Mitsubishi Chemical Corporation

Nylon 6I/6T: Selar (registered trademark) PA3426 (manufactured by DuPont)

StCo: Cobalt stearate: manufactured by Wako Pure Chemical Industries, Ltd.

[Measurement Methods]
<Oxygen Barrier Property of Container>

The oxygen barrier property of the container was evaluated by the following method.

An oxygen permeability test by the MOCON method was conducted in conformity with ASTM D3985. For the measurement, OX-TRAN2/61, manufactured by MOCON Inc. was used. 100 mL of water was filled in a 500-mL bottle obtained in each of the Examples and Comparative Examples; nitrogen at 1 atm was made to flow into the inside of the bottle at a rate of 20 mL/min under a condition of an oxygen partial pressure of 0.21 atm at a temperature of 23° C. and at a bottle internal humidity of 100% RH, and an external humidity of 50% RH; and oxygen contained in the nitrogen after flowing in the inside of the bottle was detected by a coulometric sensor.

<Color Tone>

The color tone of the obtained pellet was evaluated by the following method.

The color tone of the pellet was measured based on JIS Z 8722 in the following manner. That is, the pellets were filled in a 30-mmϕ cell container and measured four times by the reflection method with a color-difference meter ZE-2000 (manufactured by Nippon Denshoku Industries Co., Ltd., using a halogen lamp at 12 V and 20 W), and an average value thereof was defined as the color tone.

The b* value expresses a chromaticity. "+b*" expresses the yellow direction, and "−b*" expresses the blue direction. In addition, it is meant that as the Δb* value is small, the yellowing is suppressed. The Δb* value expresses a difference between the b* value of each of samples of the Examples and Comparative Examples in which the following treatment was conducted and the b* value of the polyester resin alone in which the same treatment as in the Examples and Comparative Examples was conducted.

<Polyamide Resin (Y1) Concentration>

Using a trace total nitrogen analyzer TN-2100H (manufactured by Mitsubishi Chemical Analytech Co., Ltd.), a calibration curve was prepared using a pyridine/toluene mixed solution which had been regulated to a predetermined concentration as a standard concentration, and the nitrogen content was measured using 4 to 8 mg of the sample collected from the pellet of the polyamide resin. The measurement was repeated three times, and an average value was calculated. The average value of the obtained nitrogen content was expressed in terms of the polyamide resin content according to the following equation.

$$\alpha = \beta \times (MW[\text{polyamide resin}]/MW[\text{nitrogen atom}])$$

α: polyamide resin content, β: average value of nitrogen content, MW [polyamide resin]: molecular weight per unit of polyamide resin, MW[nitrogen atom]: (molecular weight of nitrogen atom)×(nitrogen number contained per unit of polyamide resin)

<Amino Group Concentration>

0.5 g of the sample was dissolved in 30 mL of phenol/ethanol=4/1 (volume ratio), to which was then added 5 mL of methanol, and the resultant was titrated with 0.01N hydrochloric acid as a titration liquid by using an automatic titrator ("COM-2000", manufactured by Hiranuma Seisakusho Co., Ltd.). The same operation of undergoing the titration without using a sample was defined as a blank to calculate a terminal amino group concentration.

<Production of Polyamide Resin>

(Production of Polyamide Resin (Y1))

In a reactor having a capacity of 50 liters and equipped with a stirrer, a partial condenser, a total condenser, a thermometer, a dropping funnel, a nitrogen introducing pipe, and a strand die, 15,000 g (102.6 mol) of precisely weighed adipic acid, 13.06 g (123.3 mmol, 151 ppm as a phosphorus atom concentration of the polyamide) of sodium hypophosphite monohydrate ($NaH_2PO_2 \cdot H_2O$), and 6.849 g (83.49 mmol, 0.68 as a molar number ratio to the sodium hypophosphite monohydrate) of sodium acetate were charged, and after thoroughly purging with nitrogen, the resulting mixture was heated to 170° C. in a nitrogen gas stream of a small amount while stirring the inside of the system. 13,896 g (102.0 mol, 0.994 as a charge molar ratio) of metaxylylenediamine was dropped thereto under stirring, and the inside of the system was continuously subjected to temperature rise while removing the produced condensed water outside the system. After completion of dropping of metaxylylenediamine, the reaction was continued for 40 minutes while controlling the inner temperature to 260° C. Thereafter, the inside of the system was pressurized with nitrogen, and a polymer was taken away from the strand die and pelletized to obtain about 24 kg of a polyamide.

Subsequently, in a jacket-equipped tumbler dryer provided with a nitrogen gas introducing pipe, a vacuum line, a vacuum pump, and a thermocouple for inner temperature measurement, the aforementioned polyamide was charged; the inside of the tumbler dryer was thoroughly purged with a nitrogen gas having a purity of 99% by volume or more while rotating at a fixed rate; the tumbler dryer was then heated under the same nitrogen gas stream; and a pellet temperature was raised to 150° C. over about 150 minutes. At a point of time when the pellet temperature reached 150° C., the pressure within the system was reduced to 1 torr or less. The temperature rise was further continued, the pellet temperature was raised to 200° C. over about 70 minutes, and the system was then held at 200° C. for 30 to 45 minutes. Subsequently, a nitrogen gas having a purity of 99% by volume or more was introduced into the system, and the system was cooled while continuing the rotation of the tumbler dryer, thereby obtaining a polyamide resin (Y1). As a result of measuring a terminal amino group concentration, it was found to be 14.4 μmol/g.

(Production of Polyamide Resin (Y2))

A polyamide resin (Y2) was obtained by conducting the synthesis in the same manner as in the polyamide (Y1), except for changing the charge amount of metaxylylenediamine to 13,812 g (101.4 mol, 0.988 as a charge molar ratio). As a result of measuring a terminal amino group concentration, it was found to be 8.2 μmol/g.

[Manufacture of Multilayer Container and Recycle Property Evaluation]

<Preparation of Polyester Resin Composition>

A polyester resin (polyethylene terephthalate (intrinsic viscosity: 0.83 dL/g), trade name: RT543C, manufactured by Nippon Unipet Co., Ltd.) and an additive shown in Table 1 were subjected to dry blending using a tumbler, thereby preparing a polyester resin mixture.

The "wt %" described within the parenthesis after the kind of additive in the table means an amount (mass %) of the additive based on 100% by mass of the polyester resin mixture.

<Preform Molding>

Using an injection molding machine having two injection cylinders (type: DU130CI, manufactured by Sumitomo Heavy Industries, Ltd.) and a die with two cavities (manufactured by Kortec), the polyester resin mixture shown in Table 1 was injected from the one-sided injection cylinder, and the polyamide resin was injected from the other injection cylinder; and a three-layer preform composed of polyester resin composition layer/polyamide resin layer/polyester resin composition layer (set to an amount corresponding to 26 g per preform) was produced by means of injection molding under the following condition such that a mass proportion of the polyester resin mixture to the polyamide resin was 95/5. The preform had a shape having a total length of 95 mm, an outer diameter of 22 mm, and a wall thickness of 4.0 mm. The molding condition of each of the three-layer preform and the single-layer preform is as follows.

Injection cylinder temperature on the skin side: 280° C.

Injection cylinder temperature on the core side (only the three layers): 290° C.

Resin channel temperature within the die: 290° C.

Cooling water temperature of the die: 15° C.

Cycle time: 40 seconds

<Bottle Molding>

The above-obtained preform was subjected to biaxial stretch blow molding with a blow molding device (EFB1000ET, manufactured by Frontier Inc.), thereby obtaining a bottle (hollow multilayer container). The bottle had a total length of 223 mm, an outer diameter of 65 mm, and an inner volume of 500 mL, and the bottom thereof had a petaloid shape. A dimple was not provided in the body. The biaxial stretch blow molding condition is as follows.

In the following 1A, a single-layer preform was prepared in the same manner, except for not using the polyamide resin layer, from which was then obtained a hollow single-layer container.

Preform heating temperature: 108° C.
Pressure for stretch rod: 0.5 MPa
Primary blow pressure: 0.7 MPa
Secondary blow pressure: 2.5 MPa
Primary blow delay time: 0.34 seconds
Primary blow time: 0.30 seconds
Secondary blow time: 2.0 seconds
Blow exhaustion time: 0.6 seconds
Die temperature: 30° C.

<Recycle Evaluation in Multilayer Bottle>
(Air Classification Step)

10 kg of the above-obtained hollow multilayer container or hollow single-layer container was formed into a milled flake by using a milling machine, and the flake was then washed with water. Thereafter, the resulting flake was treated using a froth separator CFS-150 (manufactured by ACO Co., Ltd.) at a feed rate of 10 kg/hr under a condition of suction blower: 35 Hz and secondary blower: 30 Hz, and a material with a heavy specific gravity, which dropped on a lower receiver, was recovered. This air classification was further carried out three times. Finally, the flaky milled product having dropped on the lower receiver was recovered as the regenerated polyester resin.

(Granulation Step)

The recovered regenerated polyester resin was extruded in a strand form using an extruder in which a strand die was installed in a vacuum vent-equipped biaxial extruder (aperture: 37 mmφ), at a heater temperature of 270 to 290° C. and a discharge rate of 20 kg/hr, and cut by a pelletizer while cooling with a water tank, thereby undergoing pelletization.

(Crystallization/Solid-Phase Polymerization (SSP) Step)

The pellet obtained in the aforementioned granulation step was heated under a nitrogen gas stream at 205° C. for 7 hours, and the resulting pellet was then taken away and evaluated for the color tone. The results are shown in Table 1.

A simple flow chart of the present Examples is shown in FIG. 1.

TABLE 1

| Container structure | | | 1A | 1B | 1C | 1D | 1E | 1F | 1G | 1H |
|---|---|---|---|---|---|---|---|---|---|---|
| Skin layer (polyester resin layer) | Polyester resin | Additive | | | | | | | | |
| | RT543C | No | 100 | 95 | — | — | — | — | — | — |
| | RT543C | Triple A (0.20 wt %) | — | — | 95 | — | 95 | — | — | — |
| | RT543C | 2-Anthranilamide (0.067 wt %) | — | — | — | 95 | — | — | — | — |
| | RT543C | Polyamide resin (Y1) (1.0 wt %) | — | — | — | — | — | 95 | — | — |
| | RT543C | Senz AA (0.35 wt %) | — | — | — | — | — | — | 95 | 95 |
| Core layer (polyamide resin layer) | Polyamide resin (Y1) | | — | 5 | 5 | 5 | — | 5 | 5 | — |
| | Polyamide resin (Y1) + StCo 1,000 ppm | | — | — | — | — | 5 | — | — | 5 |
| Oxygen barrier property of container (cc/(bottle · 0.21 atm · day)) | | | 0.043 | 0.019 | 0.019 | 0.019 | 0.000 | 0.018 | 0.019 | 0.000 |
| Melt-blended product of flake after air classification (non-crystal pellet) | Evaluation | Polyamide resin (Y1) concentration (ppm) | 0 | 550 | 580 | 480 | 470 | 1690 | 510 | 490 |
| | | b* | 7.7 | 9.4 | 5.4 | 8.4 | 8.8 | 10.1 | 6.0 | 9.4 |
| | | Δb* | — | 1.7 | −2.3 | 0.7 | 1.1 | 2.4 | −1.7 | 1.7 |
| After SSP (crystal pellet) (obtained by treating the melt-blended product under a nitrogen gas steam at 205° C. for 7 hours) | | b* | 7.4 | 9.9 | 4.9 | 8.5 | 8.9 | 11.3 | 5.8 | 9.5 |
| | | Δb* | — | 2.5 | −2.5 | 1.1 | 1.5 | 3.9 | −1.6 | 2.1 |

In Table 1, Δb* expresses a difference from b* of 1A.

According to Table 1, in 1B in which the additive is not contained, as compared with the case of the polyester resin alone, the increase of b* was large, and the yellowing proceeded due to recovery and regeneration. On the other hand, in 1C, 1D, and 1G containing Triple A, 2-anthranilamide, and Senz AA (nylon 6I/6T), respectively, the yellowing was significantly suppressed. In particular, in the case using Triple A, an excellent effect for suppressing the yellowing was brought. On the other hand, as shown in 1F, in the case of containing, as the additive, the polyamide (Y1) that is MXD6, the yellowing proceeded.

In addition, by including the polyamide resin layer, the oxygen barrier property of the container was improved, and in particular, as shown in 1E and 1H, in the case where the polyamide resin layer contains cobalt stearate (StCo) that is a transition metal, the oxygen barrier property was significantly improved.

In the present invention, the recycle property of the polyester resin (PET) multilayer container containing a polyamide resin was evaluated by applying an equal thermal history to each of the polyester and the polyamide by the following method until a step of obtaining a regenerated product of the polyester going through various regeneration steps from the multilayer container. A simple flow chart of the present Examples is shown in FIG. 2. Specifically, the thermal history received in the preform molding step for preparing the multilayer container and the granulation step in the recycle process was considered to be equal to the thermal history which each of the polyester resin composition and the polyamide resin received in the extrusion pelletization step and the thermal history which these received in the melt blending step by the extruder, the evaluation was made. In addition, the thermal history which the multilayer container received in the milling, washing, and separation steps during the recycle process is a thermal history to a negligible extent as compared with the thermal history received in the molding step and the granulation step, and therefore, the foregoing thermal history was not taken into consideration.

In this process, on the assumption that the air classification was not conducted, or the polyamide resin layer was not thoroughly separated, there is included no removal step of the polyamide resin.

(Preparation of Polyester Resin Composition Pellet)

The polyester resin and the additive were dry blended using an extruder in which a strand die was installed in a vacuum vent-equipped biaxial extruder (aperture: 18 mmϕ), and thereafter, the blend was processed in a strand form at a heater temperature of 290° C. and a discharge rate of 7 kg/hr and then cut by a pelletizer while cooling with a water tank, thereby undergoing pelletization. The color tone of the resulting polyester resin composition pellet is shown in Table 2.

(Preparation of Polyamide Resin Pellet)

The polyamide resin was pelletized in the same manner as in the polyester resin by using a vacuum vent-equipped biaxial extruder (aperture: 18 mmϕ) at a heater temperature of 270° C., thereby preparing the polyamide resin pellet.

TABLE 2

| | | | 2A | 2B | 2C | 2D | 2E | 2F | 2G | 2H | 2I | 2J | 2K | 2L | 2M |
|---|---|---|---|---|---|---|---|---|---|---|---|---|---|---|---|
| Polyester resin | RT543C | wt % | 100 | 99.95 | 99.9 | 99.95 | 99.9 | 99.9 | 99.9 | 99.9 | 99.83 | 99.65 | 99.9 | 99.8 | 99.767 |
| Additive | 2-Anthranilamide | wt % | — | 0.05 | 0.1 | — | — | — | — | — | — | — | — | — | — |
| | 2-Anthranilic acid | wt % | — | — | — | 0.05 | — | — | — | — | — | — | — | — | — |
| | ADEKA STAB LA-57 | wt % | — | — | — | — | 0.1 | — | — | — | — | — | — | — | — |
| | ADEKA STAB LA-77Y | wt % | — | — | — | — | — | 0.1 | — | — | — | — | — | — | — |
| | Trimethylolpropane | wt % | — | — | — | — | — | — | 0.1 | — | — | — | — | — | — |
| | 1,3-BAC (trans 40%) | wt % | — | — | — | — | — | — | — | 0.1 | — | — | — | — | — |
| | Senz AA | wt % | — | — | — | — | — | — | — | — | 0.17 | 0.35 | — | — | — |
| | Triple A | wt % | — | — | — | — | — | — | — | — | — | — | 0.1 | 0.2 | — |
| | Nylon 6I/6T | wt % | — | — | — | — | — | — | — | — | — | — | — | — | 0.233 |
| Melt-blended product (non-crystal pellet) | b* | | 0.7 | 3.4 | 3.8 | 5.8 | 9.6 | 3.4 | 0.6 | 11.3 | −2.2 | −3.9 | −0.3 | −3.7 | 5.2 |
| | Δb* | | — | 2.7 | 3.1 | 5.1 | 8.9 | 2.7 | −0.1 | 10.6 | −2.9 | −4.6 | −1.0 | −4.4 | 4.5 |

<Granulation Step>

The obtained polyester resin composition pellet and polyamide resin pellet were dried using a hot air dryer at 150° C. for 4 hours, the dried pellets were dry blended in a blending ratio described in Table 3, and the blend was melt kneaded in the same manner as described above by using a biaxial extruder at a heater temperature of 280° C., followed by pelletization. The color tone of each of the resulting pellets was measured and shown in Table 3 (corresponding to the melt-blended product of flake after air classification). In addition, in 3D and 3P, 2-anthranilamide or γ-butyrolactone was further dry blended in the polyester resin pellet and the polyamide pellet, and the blend was melt kneaded in the same manner, followed by pelletization.

The resulting resin composition pellet is considered to have received a thermal history in the same degree as in one resulting from milling and granulation of the multilayer container in the recycle process.

In 2E and 2H, the polyester resin composition was strongly colored, and therefore, the subsequent studies were not conducted.

(Crystallization/Solid-Phase Polymerization Step)

The above-obtained resin composition pellet was held in an inert oven DN610I (manufactured by Yamato Scientific Co., Ltd.) under a nitrogen gas stream at a rate of 30 L/min for 1 hour, thereby replacing the inner gas. Thereafter, the temperature was raised until the material temperature reached 205° C., and when the inner temperature reached 205° C., the holding was continued for 7 hours while continuously flowing nitrogen. After holding, the resultant was cooled under a nitrogen gas stream until the inner temperature reached 60° C. or lower, followed by taking away the pellet. The evaluation results of color tone of the taken-away pellet are shown in Table 3 (the item of "after SSP").

TABLE 3

| | Polyester resin | Additive | Addition amount | 3A Reference Example | 3B Reference Example | 3C Comparative Example | 3D Comparative Example | 3E Example | 3F Example | 3G Example | 3H Example | 3I Comparative Example | 3J Comparative Example | 3K Example | 3L Example | 3M Example | 3N Example | 3O Example | 3P Comparative Example |
|---|---|---|---|---|---|---|---|---|---|---|---|---|---|---|---|---|---|---|---|
| Polyester resin composition | 2A RT543C | No | — | 100 | — | 95 | 95 | — | — | — | — | — | — | — | — | — | — | — | 94 |
| | 2B RT543C | 2-Anthranilamide | 0.05 wt % | — | 100 | — | — | 95 | 95 | — | — | — | — | — | — | — | — | — | — |
| | 2C RT543C | 2-Anthranilamide | 0.10 wt % | — | — | — | — | — | — | 95 | — | — | — | — | — | — | — | — | — |
| | 2D RT543C | 2-Anthranilic acid | 0.05 wt % | — | — | — | — | — | — | — | 95 | — | — | — | — | — | — | — | — |
| | 2F RT543C | ADEKA STAB LA-77Y | 0.10 wt % | — | — | — | — | — | — | — | — | 95 | — | — | — | — | — | — | — |
| | 2G RT543C | Trimethylolpropane | 0.10 wt % | — | — | — | — | — | — | — | — | — | 95 | — | — | — | — | — | — |
| | 2I RT543C | Senz AA | 0.17 wt % | — | — | — | — | — | — | — | — | — | — | 95 | — | — | — | — | — |
| | 2J RT543C | Senz AA | 0.35 wt % | — | — | — | — | — | — | — | — | — | — | — | 95 | — | — | — | — |
| | 2K RT543C | Triple A | 0.10 wt % | — | — | — | — | — | — | — | — | — | — | — | — | 95 | — | — | — |
| | 2L RT543C | Triple A | 0.20 wt % | — | — | — | — | — | — | — | — | — | — | — | — | — | 95 | — | — |
| | 2M RT543C | Nylon 6I/6T | 0.233 wt % | — | — | — | — | — | — | — | — | — | — | — | — | — | — | 95 | — |
| Polyamide resin composition | | Polyamide resin (Y1) | | — | — | 5 | 5 | 5 | — | 5 | 5 | 5 | 5 | 5 | 5 | 5 | 5 | 5 | 5 |
| | | Polyamide resin (Y2) | | — | — | — | — | — | 5 | — | — | — | — | — | — | — | — | — | — |
| Additive | | 2-Anthranilamide | | — | — | — | 0.05 | — | — | — | — | — | — | — | — | — | — | — | — |
| | | γ-butyrolactone | | — | — | — | — | — | — | — | — | — | — | — | — | — | — | — | 1 |
| Melt blend (non-crystal pellet) | | | b* | 3.1 | 8.5 | 11.3 | 9.9 | 9.6 | 7.6 | 8.8 | 10.1 | 12.1 | 11.7 | 5.4 | 1.9 | 4.7 | 1.5 | 8.2 | 13.4 |
| | | | Δb* | — | 5.4 | 8.2 | 6.8 | 6.5 | 4.5 | 5.7 | 7.0 | 9.0 | 8.6 | 2.3 | −1.2 | 1.6 | −1.6 | 5.1 | 10.3 |
| After SSP (crystal pellet) (obtained by treating the melt-blended product under a nitrogen gas steam at 205° C. for 7 hours) | | | b* | 4.1 | 12.5 | 16.6 | 14.7 | 11.2 | 10.2 | 10.0 | 13.5 | 16.8 | 17.4 | 10.3 | 6.2 | | | | |
| | | | Δb* | — | 8.4 | 12.5 | 10.6 | 7.1 | 6.1 | 5.9 | 9.4 | 12.7 | 13.3 | 6.2 | 2.1 | | | | |

| | | | | | |
|---|---|---|---|---|---|
| After SSP (crystal pellet) (obtained by treating the melt-blended product under a nitrogen gas steam at 205° C. for 7 hours) | b* | 5.5 | 0.7 | 14.2 | 18.6 |
| | Δb* | 1.4 | −3.4 | 10.1 | 14.5 |

In Table 2, Δb* expresses a difference from b* of 2A.

According to Table 2, as compared with the polyester resin pellet (2A) not containing the additive, in the polyester resin compositions (2B to 2D and 2I to 2M) in which the compound (A) was added, the value of Δb* was small, so that it was exhibited that the influence of the polyester resin against the yellowing due to the matter that the additive was contained was small. On the other hand, in 2E and 2H in which ADEKA STAB LA-57 that is a hindered amine-based light stabilizer and 1,3-BAC that is an aldehyde scavenger were added, respectively, the polyester resin composition became yellowish due to the addition thereof. In 2E and 2H, the polyester resin composition was strongly colored, and therefore, the subsequent studies were not conducted.

In Table 3, Δb* expresses a difference from b* of 3A.

According to Table 3, as compared with the polyester resin alone (3A), in the case of containing the polyamide resin (3C), the increase of b* was large, and the yellowing proceeded. On the other hand, in 3E to 3H and 3K to 3O each containing the compound (A), the yellowing was significantly suppressed. In particular, in 3F in which the polyamide resin having a lower amino group concentration was used, the yellowing was suppressed as compared with 3E in which the polyamide resin having a higher amino group concentration was used.

On the other hand, in the case of containing trimethylolpropane that is a polyhydric alcohol having an aldehyde trapping ability (3J), in the state where this was melt blended with the polyester resin, the yellowing was suppressed (2G). However, when the polyester resin composition containing this additive and the polyamide resin were melt kneaded, the yellowing was generated in the subsequent recycle process (3J).

The same matter was also observed in the case of using ADEKA STAB LA-77Y that is a hindered amine-based compound, and in the polyester resin composition obtained by melt blending with the polyester resin, the yellowing was suppressed (2F); however, when the foregoing polyester resin composition and the polyamide resin were melt kneaded, the yellowing was generated in the subsequent recycle process (3I).

When the polyester resin composition containing the lactone-based additive and the polyamide resin were melt kneaded, the yellowing was generated in the subsequent recycle process (3P).

From this fact, it was noted that it is not the case where all of conventionally known aldehyde scavengers are applicable, but only a specified compound is effective for suppressing the yellowing at the time of recycle.

In the case where 2-anthranilamide was not previously added to the polyester resin (3D), the yellowing was not thoroughly suppressed. It is to be noted that 3D is a model of the case where the polyester resin composition does not contain the compound (A).

[Production of Single-Layer Container]
<Preparation of Polyester Resin Composition>

A material prepared by extruding a polyester resin (polyethylene terephthalate (intrinsic viscosity: 0.83 dL/g), trade name: RT543C, manufactured by Nippon Unipet Co., Ltd.) and an additive shown in Table 4 in a strand form by using a biaxial extruder of 37 mmφ (TEM37BS, manufactured by Toshiba Machine Co., Ltd.) at 270° C. and at a rotation rate of 150 rpm and a discharge rate of 30 kg/hr was pelletized, thereby preparing a polyester resin composition in the same manner as the method conducted in Table 2. In 2N, a polyester resin composition was prepared in the same manner as in 2C, except that the content of the 2-anthranilamid was changed to 0.067% by mass.

After dry blending the polyester resin composition and the polyamide resin, the preform molding and two steps corresponding to the recycle process and the granulation step (granulation step and crystallization/solid-phase polymerization step) were conducted in the same manner as in the recycle property evaluation, thereby carrying out the respective evaluations. The melt blending (corresponding to the preform molding and granulation step) was conducted by extrusion into a strand form by using a biaxial extruder of 37 mmφ (TEM37BS, manufactured by Toshiba Machine Co., Ltd.) at 280° C. and at a rotation rate of 150 rpm and a discharge rate of 30 kg/hr, followed by pelletization.

A simple flow chart of the present Examples is shown in FIG. 3.

TABLE 4

| | | Polyester resin | Additive | | 4A | 4B | 4C | 4D | 4E | 4F | 4G | 4H |
|---|---|---|---|---|---|---|---|---|---|---|---|---|
| Polyester resin composition | 2A | RT543C | No | wt % | 100 | 95 | — | — | — | — | — | — |
| | 2K | RT543C | Triple A (0.10 wt %) | wt % | — | — | 95 | — | — | — | — | — |
| | 2L | RT543C | Triple A (0.20 wt %) | wt % | — | — | — | 95 | — | — | — | — |
| | 2N | RT543C | 2-Anthranilamide (0.067 wt %) | wt % | — | — | — | — | 95 | — | — | — |
| | 2I | RT543C | Senz AA (0.17 wt %) | wt % | — | — | — | — | — | 95 | — | — |
| | 2J | RT543C | Senz AA (0.35 wt %) | wt % | — | — | — | — | — | — | 95 | — |
| | 2M | RT543C | Nylon 6I/6T (0.233 wt %) | wt % | — | — | — | — | — | — | — | 95 |
| Polyamide resin | | Polyamide resin (Y1) | | wt % | — | 5 | 5 | 5 | 5 | 5 | 5 | 5 |
| Second melt blending (non-crystal pellet) | | | b* | | 3.1 | 9.7 | 4.7 | 1.5 | 6.7 | 5.2 | 1.7 | 7.9 |
| | | | Δb* | | — | 6.6 | 1.6 | −1.6 | 3.6 | 2.1 | −1.4 | 4.8 |
| Third melt blending (non-crystal pellet) | | | b* | | 5.9 | 14.4 | 7.7 | 5.4 | 8.0 | 8.5 | 5.0 | 11.2 |
| | | | Δb* | | — | 8.5 | 1.8 | −0.5 | 2.1 | 2.6 | −0.9 | 5.3 |
| After SSP (crystal pellet) (obtained by treating the melt-blended product under a nitrogen gas steam at 205° C. for 7 hours) | | | b* | | 6.6 | 18.1 | 12.8 | 7.7 | 14.4 | 14.2 | 10.8 | 16.8 |
| | | | Δb* | | — | 11.5 | 6.2 | 1.1 | 7.8 | 7.6 | 4.2 | 10.2 |

In Table 4, Δb* expresses a difference from b* of 4A.

According to Table 4, it was noted that in the case of not containing the additive (4B), the yellowing proceeded; however, by adding Triple A, 2-anthranilamide, Senz AA, or nylon 6I/6T, the yellowing was significantly suppressed.

The invention claimed is:

1. A multilayer container comprising
   at least one polyester resin composition layer consisting of a polyester resin (X) and an amino group-containing compound (A) having a yellowing-suppressing ability, the polyester resin (X) including at least one of a regenerated polyester resin, a material derived from a used polyester, and an industrially recycled polyester; and
   at least one polyamide resin layer consisting of a polyamide resin (Y), a cobalt carboxylate, a lubricant, and a spreader, wherein the at least one polyamide resin layer does not contain the polyester resin (X) or the amino group-containing compound (A),
   wherein the amino group-containing compound (A) having a yellowing-suppressing ability is at least one compound selected from the group consisting of anthranilamide and anthranilic acid and wherein the at least one polyester resin composition layer does not contain the polyamide resin (Y).

2. The multilayer container according to claim 1, wherein the polyester resin (X) has a structural unit derived from a dicarboxylic acid and a structural unit derived from a diol, 80 mol % or more of the structural unit derived from a dicarboxylic acid being a structural unit derived from terephthalic acid; and 80 mol % or more of the structural unit derived from a diol being a structural unit derived from ethylene glycol.

3. The multilayer container according to claim 1, wherein the polyamide resin (Y) has a structural unit derived from a diamine and a structural unit derived from a dicarboxylic acid, 80 mol % or more of the structural unit derived from a diamine being a structural unit derived from xylylenediamine; and 80 mol % or more of the structural unit derived from a dicarboxylic acid being a structural unit derived from adipic acid.

4. The multilayer container according to claim 1, wherein the content of the amino group-containing compound (A) having a yellowing-suppressing ability is from 0.005 to 3.0 parts by mass based on 100 parts by mass of the polyester resin (X).

5. The multilayer container according to claim 1, wherein the multilayer container is a multilayer hollow container.

6. The multilayer container according to claim 1, wherein the multilayer container has two or more polyester resin composition layers and has at least one polyamide resin layer sandwiched directly or indirectly between the polyester resin composition layers.

7. The multilayer container according to claim 1, wherein the multilayer container has a three-layer structure and has a polyamide resin layer sandwiched between two layers of the polyester resin composition layer.

8. The multilayer container according to claim 1, wherein an amino group concentration of the polyamide resin (Y) is 50 µmol/g or less.

9. The multilayer container according to claim 1, wherein the polyamide resin layer contains a transition metal.

* * * * *